United States Patent
Lee et al.

(10) Patent No.: US 10,948,913 B2
(45) Date of Patent: Mar. 16, 2021

(54) METHOD OF IDENTIFYING UNEXPECTED OBSTACLE AND ROBOT IMPLEMENTING THE METHOD

(71) Applicant: LG ELECTRONICS INC., Seoul (KR)

(72) Inventors: Changhyeon Lee, Seoul (KR); Byungkon Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 470 days.

(21) Appl. No.: 15/892,589

(22) Filed: Feb. 9, 2018

(65) Prior Publication Data

US 2018/0239355 A1 Aug. 23, 2018

(30) Foreign Application Priority Data

Feb. 20, 2017 (KR) ........................ 10-2017-0022238

(51) Int. Cl.
| | |
|---|---|
| *G05D 1/00* | (2006.01) |
| *G01S 17/931* | (2020.01) |
| *G06K 9/00* | (2006.01) |
| *G01C 21/00* | (2006.01) |
| *G05D 1/02* | (2020.01) |
| *G01C 3/08* | (2006.01) |
| *G08G 1/16* | (2006.01) |

(52) U.S. Cl.
CPC ............ *G05D 1/0088* (2013.01); *G01C 3/08* (2013.01); *G01C 21/005* (2013.01); *G01S 17/931* (2020.01); *G05D 1/0212* (2013.01); *G05D 1/0231* (2013.01); *G05D 1/0274* (2013.01); *G06K 9/00362* (2013.01); *G06K 9/00369* (2013.01); *G06K 9/00664* (2013.01); *G06K 9/00805* (2013.01); *G08G 1/161* (2013.01); *G08G 1/166* (2013.01)

(58) Field of Classification Search
USPC .......................................................... 701/27
See application file for complete search history.

(56) References Cited

U.S. PATENT DOCUMENTS

| | | | |
|---|---|---|---|
| 2008/0215184 A1* | 9/2008 | Choi ................... | G06K 9/00664 700/259 |
| 2015/0046018 A1 | 2/2015 | Hayashi et al. | |
| 2015/0148949 A1* | 5/2015 | Chin ........................ | B05D 1/02 700/245 |

(Continued)

FOREIGN PATENT DOCUMENTS

| | | |
|---|---|---|
| JP | 2015-035139 | 2/2015 |
| JP | 60-72934 | 2/2017 |

OTHER PUBLICATIONS

Korean Office Action dated Nov. 13, 2018 issued in KR Application No. 10-2017-0022238.

*Primary Examiner* — Tyler D Paige
(74) *Attorney, Agent, or Firm* — Ked & Associates, LLP

(57) ABSTRACT

The present disclosure relates to a method of identifying an unexpected obstacle and a robot implementing the method. The method includes: by a sensing module of a robot, sensing a blind spot located in a traveling path of the robot; by a control unit of the robot, calculating a probability that a moving object appears in the sensed blind spot; and, by the control unit, controlling the speed or direction of a moving unit of the robot based on the calculated probability.

20 Claims, 16 Drawing Sheets

(56) References Cited

U.S. PATENT DOCUMENTS

| | | | |
|---|---|---|---|
| 2015/0253777 A1* | 9/2015 | Binney | G06Q 10/08 |
| | | | 701/28 |
| 2016/0188977 A1* | 6/2016 | Kearns | G05D 1/0274 |
| | | | 348/113 |
| 2016/0299509 A1* | 10/2016 | Ueda | B25J 9/1676 |
| 2016/0375592 A1* | 12/2016 | Szatmary | B25J 11/0085 |
| | | | 700/255 |
| 2017/0010100 A1* | 1/2017 | Takeuchi | G05D 1/0276 |
| 2018/0239355 A1* | 8/2018 | Lee | G08G 1/166 |
| 2020/0130197 A1* | 4/2020 | Roh | B25J 19/04 |

* cited by examiner

FIG. 8

| Sensing Time (hh:mm:ss) | Sensing Direction | Data | Intensity |
|---|---|---|---|
| 10:05:05 | Forward Left 30° | 0.3 m | 10 |
| 10:05:10 | Forward Left 30° | 0.3 m | 10 |
| 10:05:15 | Forward Left 30° | 0.3 m | 10 |
| 10:05:20 | Forward Left 30° | 0.3 m | 10 |
| 10:05:25 | Forward Left 30° | 2 m | 8 |
| 10:05:26 | Forward Left 30° | 2 m | 8 |
| 10:05:27 | Forward Left 30° | 0.3 m | 5 |
| 10:05:28 | Forward Left 30° | 0.3 m | 5 |

891 (rows 1–4), 892 (rows 5–8)

FIG. 9
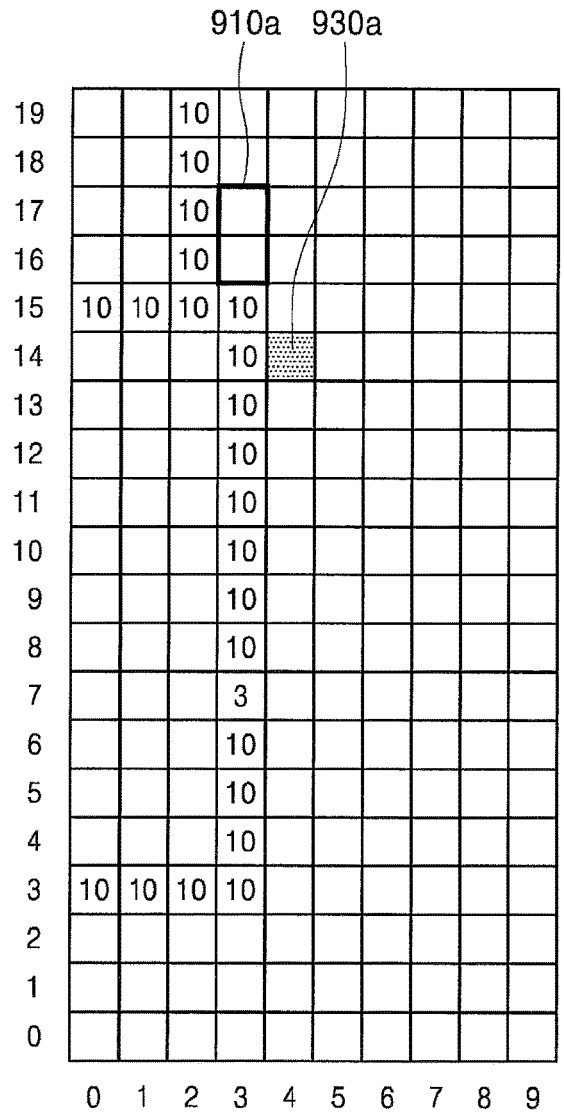
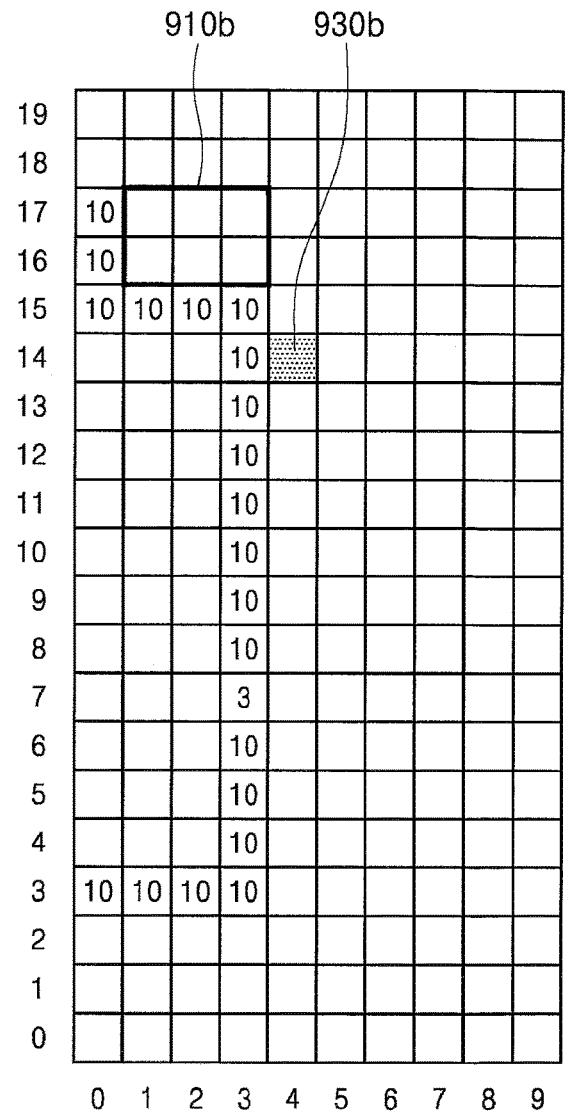
991 992

FIG. 12
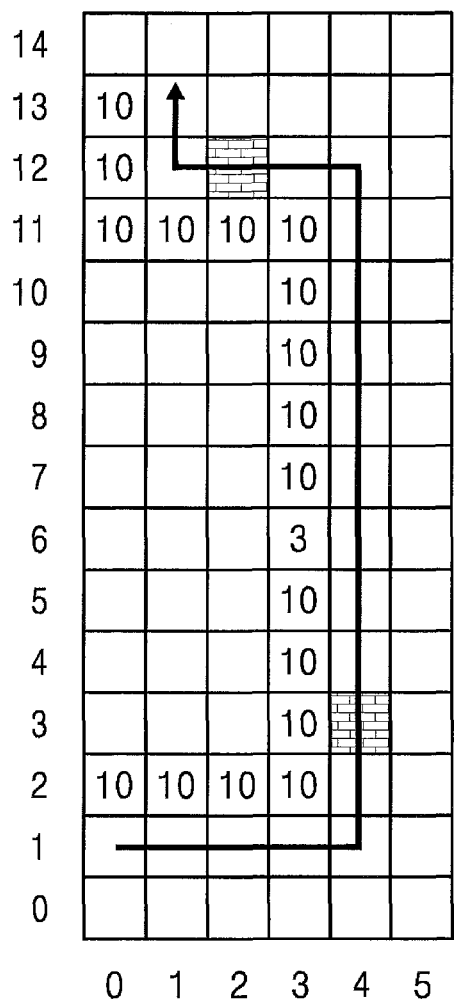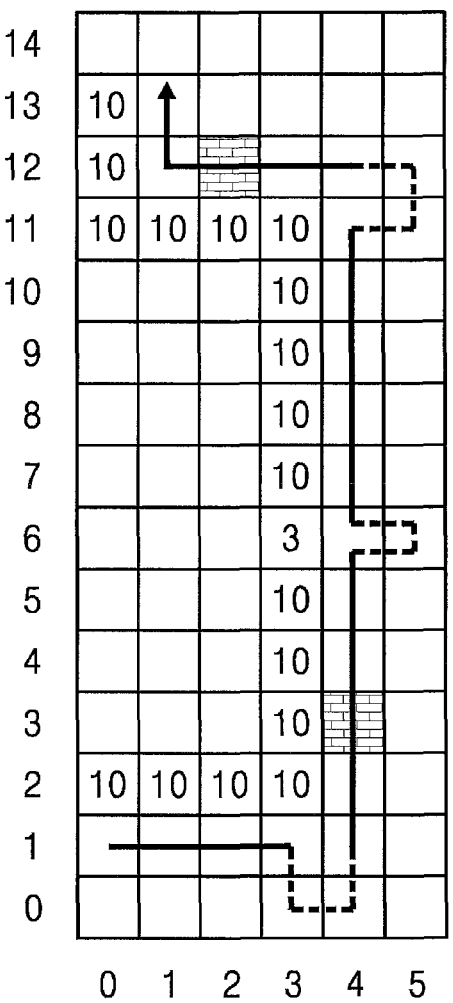
1201  1202
▦ BLIND SPOT
——— NORMAL TRAVELING MODE
------ BLIND SPOT TRAVELING MODE

METHOD OF IDENTIFYING UNEXPECTED OBSTACLE AND ROBOT IMPLEMENTING THE METHOD

CROSS-REFERENCE TO RELATED APPLICATION

This application claims priority under 35 U.S.C. § 119 to Korean Application No. 10-2017-0022238, filed on Feb. 20, 2017, whose entire disclosure is hereby incorporated by reference.

BACKGROUND

1. Field

The present disclosure relates to a method of identifying an unexpected obstacle and a robot implementing the method.

2. Background

In order for a robot to operate in a space where human and material exchanges actively occur, such as airports, schools, government offices, hotels, offices, factories and so on, the robot has to have a map on the whole space. In addition, it is necessary for the robot to predict the movement of obstacles such as a person and an object, which are not described in the map, while the robot is traveling based on the map. These obstacles may enter the robot's traveling path nonspecifically, so it is necessary to run the robot so as to avoid collision with these obstacles.

In particular, when a space is partially blocked by a wall or a pillar on a map but a person or an object suddenly enter the space through a detour path, for example, when a person or an object appears in a blind spot which cannot be sensed by sensors of the robot, the robot may not be able to keep its balance by collision with the person or the object or by sudden turn due to unexpected external variables. While performing a function in the whole space, the robot can detect an external moving obstacle, but its detection speed may decrease for an unexpected obstacle suddenly appearing in the blind spot.

Accordingly, it may be helpful to have a technique that enables a robot to travel in response to unexpected obstacles suddenly detected by sensors of the robot while the robot is traveling based on the map of a space.

BRIEF DESCRIPTION OF THE DRAWINGS

The embodiments will be described in detail with reference to the following drawings in which like reference numerals refer to like elements, and wherein:

FIG. 8 is a table showing sensing data obtained by a sensing module sensing a blind spot according to an embodiment of the present disclosure;

FIG. 9 is a view showing a map based on which a blind spot is identified according to an embodiment of the present disclosure;

FIG. 12 is a view showing a map in which a traveling path of the robot is constructed in a blind spot traveling mode according to an embodiment of the present disclosure;

DETAILED DESCRIPTION

In the following description, a robot includes a moving device having a specific purpose (cleaning, security, monitoring, guidance, etc.) or providing functions according to the nature of a space in which the robot moves. Therefore, in the following description, the robot refers generally to a device that has a moving means capable of moving by using predetermined information and a sensor and provides predetermined functions.

The robot can move while holding a map. The map means information about a fixed wall, a stair and the like that are identified not to move in a space. In addition, the robot can store information on separate objects on the map. For example, a guide platform attached to a fixed wall, a newly installed vending machine, etc., are not fixed objects but have fixability for a certain period of time, so they need to be stored as additional fixtures in the map. In particular, in the present disclosure, when there is a space behind a wall, a pillar or additional fixtures with respect to a space where the robot is provided, the robot can use the map information and sensed information in order to prevent a new moving object appearing in the space from colliding with the robot.

In one embodiment of the present disclosure, the map may store position information on a plurality of fixed objects. At this time, information on the fixability of the fixed objects is also stored. In one embodiment, a concrete wall may be stored as information with the highest fixability. A glass wall may be stored information with the fixability lower than the concrete wall. In addition, a fixed object such as a door temporarily opened or closed may be stored as information with reduced fixability.

In addition to the wall, a concrete pillar may also be stored as information with high fixability. On the other hand, an information desk, a guide board, a billboard and the like, which are fixed not persistently but for a predetermined period of time, may be stored as information with low fixability in the map. The map may additionally store the location information of the fixed objects and the value of the fixability of the fixed objects.

Hereinafter, a method of enabling the robot to travel without a collision in a blind spot such as a spot where a wall ends or a pillar and a robot implementing the same method will be described. In addition, embodiments of a technique for enabling a robot to identify a blind spot and adjusting a traveling path or a traveling direction and a traveling speed of the robot in response to an unexpected obstacle appearing in the blind spot and embodiments of a technique for enabling a robot to avoid a collision with an unexpected obstacle based on various sensing data sensed by the robot will be described.

Figure 1:
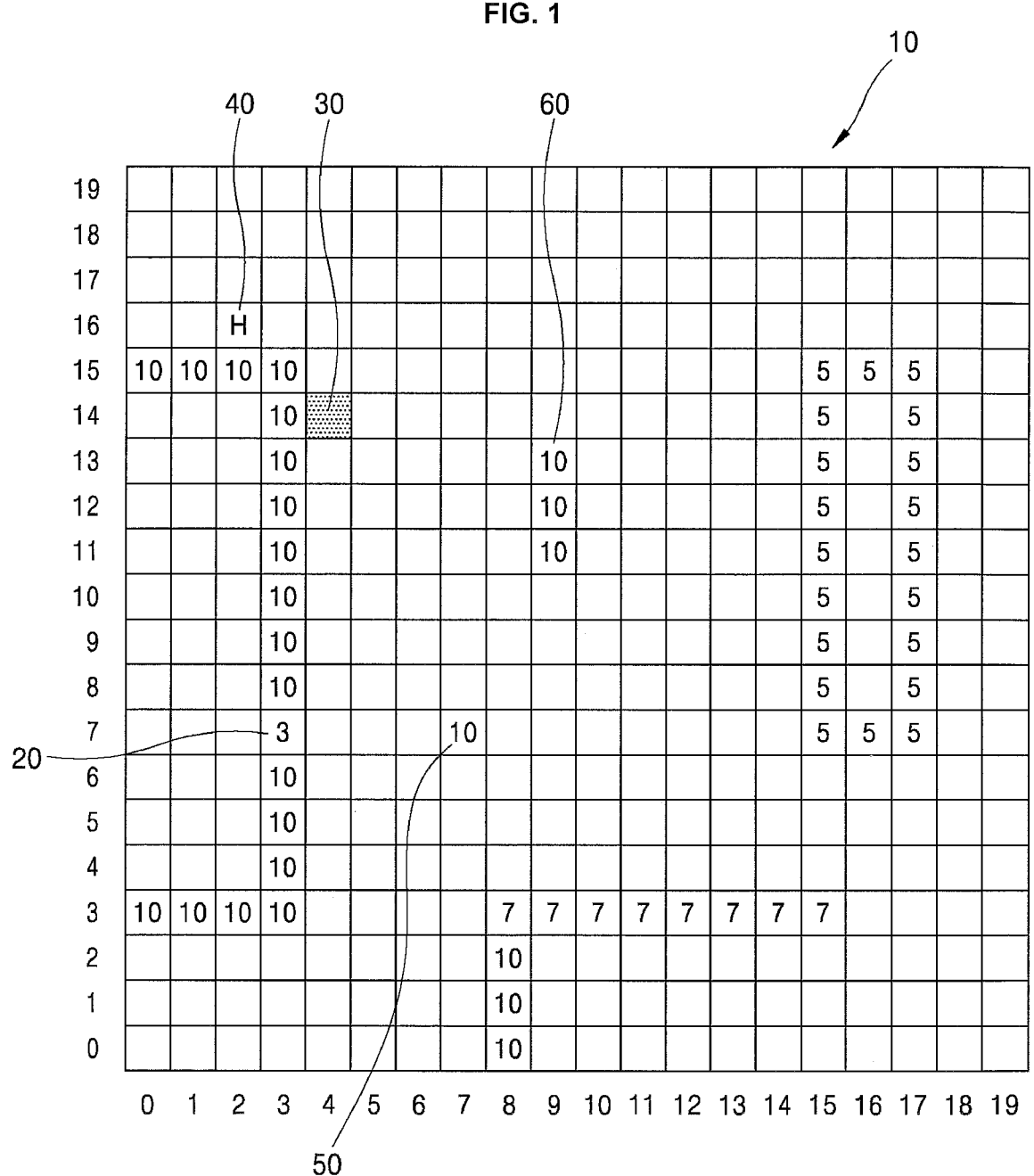
FIG. 1 is a view showing an example of the structure of a two-dimensional map according to an embodiment of the present disclosure.

FIG. 1 is a view showing an example of the structure of a two-dimensional map according to an embodiment of the present disclosure. The map can be created based on sensors of a robot or design drawings. The map can divide the whole space into a certain number of cells and indicate whether a fixed object is located in the corresponding cell. In one embodiment, if a cell has a size of 10×10 cm, the map can be constructed by indicating whether or not a fixed object is located in the cell. In another embodiment, if the size of one cell is 100×100 cm, it may indicate that a fixed object is located within the size of 1×1 meter. In addition, the location information of the object and the fixability information can be stored together. The precision of the map may decrease with the increase in size of the cell and may increase with the decrease in size of the cell. In one embodiment, the map has a bitmap structure in which the positions of fixed objects and their fixability information are arranged together in a specific space.

In the map 10, the fixability information (or fixability score) of various fixed objects has a number from 1 to 10. If the fixability information has a high value, the corresponding object is relatively fixed and is highly likely not to be moved. The fixability information representing a concrete wall may be ten. On the other hand, a glass wall may have the fixability information of 7. A value 5 indicates a movable wall that is a fixed object but is easy to be removed. In one embodiment, the fixability information may be configured based on the intensity of a sensed signal reflected during a light detection and ranging (LiDAR) sensing process.

Figure 2:
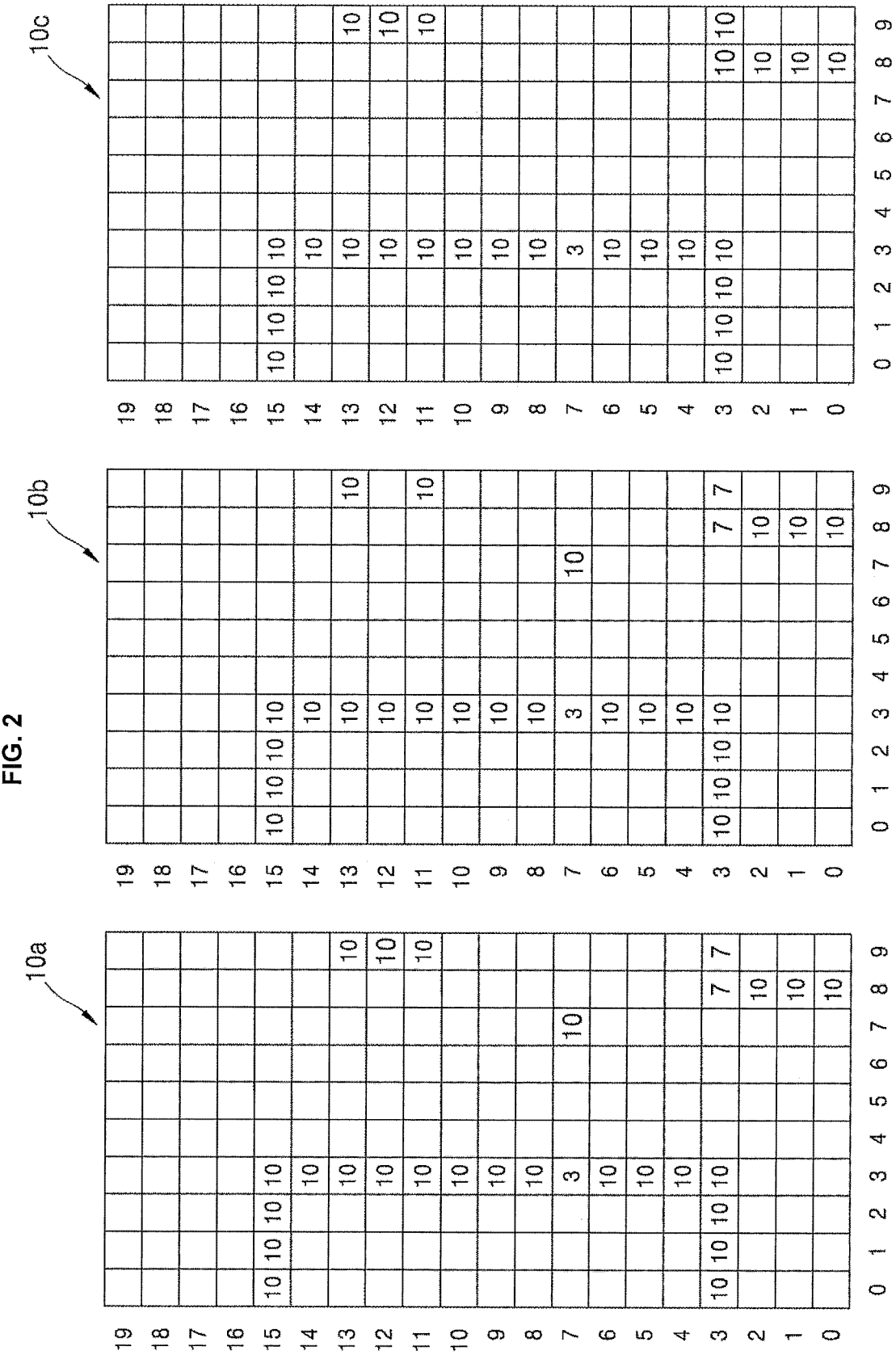
FIG. 2 is a view showing positions of fixed objects sensed at heights of h1, h2 and h3 according to an embodiment of the present disclosure.
Figure 3:
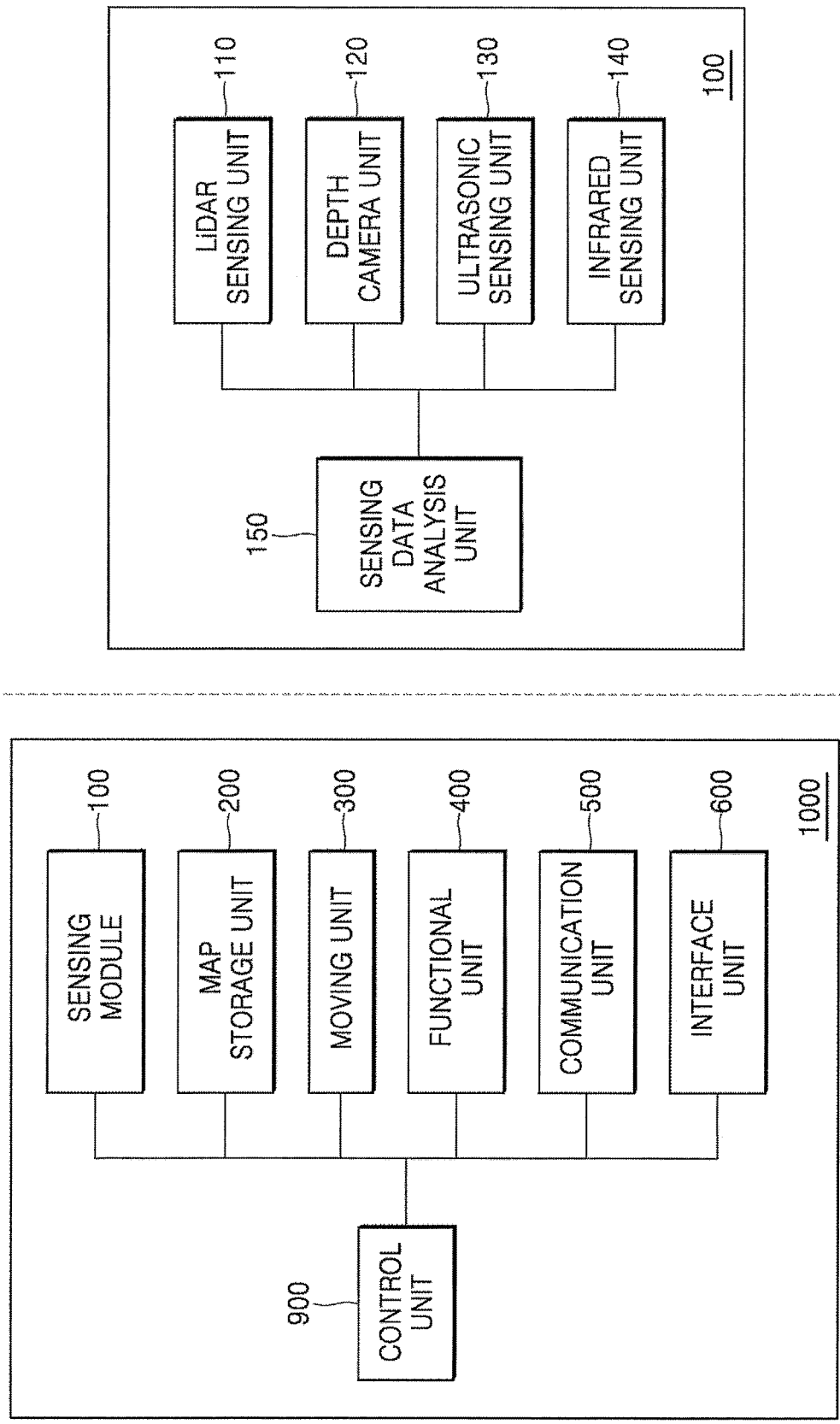
FIG. 3 is a view showing the configuration of a robot according to an embodiment of the present disclosure.

When the map 10 is fixed at a specific position such as a door but is temporarily opened or closed, it may be set as separate specified fixability information. For example, a region, which is set as the fixed information as shown in FIGS. 1 to 3, is a region where the door is opened or closed and object or people can move.

In the map 10 of FIG. 1, the robot may travel in a wall-following manner, or a sensing range of a sensor set in the robot may be reduced due to a fixed object such as a wall. For example, when the robot is provided in a region denoted by 30 on the map 10, the robot may not sense a person (indicated by H) in a region (corner area) denoted by 40. However, since the person may move, an error may occur in sensing the existence of the "H" or the movement of the "H" while the robot is approaching "H", or the robot may recognize the "H" later. This means that there is a region which cannot be sensed by the robot on the map. The same region also occurs in a pillar 50 or a separating wall 60 located on the map 10.

Hereinafter, an object moving in the traveling direction of the robot in a region where it is difficult for the robot to sense the object is referred to as an unexpected obstacle. The unexpected obstacle includes an obstacle that suddenly enters or is placed in the robot's traveling path outside the sensing range of the robot. In addition, the unexpected obstacle includes an obstacle that is suddenly sensed by the robot outside the sensing range of the robot. Further, the unexpected obstacle includes an obstacle that is not sensed in the course of sensing an object in a predictable manner but is sensed in proximity of the robot to the object due to movement of the robot or relocation of the obstacle.

A robot that travels in a complex and large space such as an airport, a harbor, a hotel, a hospital, a school or the like may have a big accident if not prepared for an unexpected obstacle. Especially, if the robot does not prepare for a cart or a person appearing behind a corner 40 or a pillar 50, it is likely to have a collision accident.

In order to solve this problem, the present disclosure provides a recognition algorithm for fusing and analyzing various data sensed by sensors to recognize a blind spot such as a corner or a pillar so that the robot can reduce its speed near the corner and the pole. Here, the sensors may be various sensors such as a LiDAR sensor and a depth camera that can generate data which can be fused and analyzed.

In one embodiment of the present disclosure, since the LiDAR sensor can sense a specific height, and the depth camera has a shorter recognition range than the LiDAR sensor, data sensed by the two sensors are fused. In addition, the present disclosure provides an algorithm for sensing a blind spot such as a corner or a pillar using map information and sensed data of the robot, which is replaced for the existing robot traveling algorithm.

For this purpose, in the present disclosure, a two-dimensional map as shown in FIG. 1 or a three-dimensional map including height information may be used. In one embodiment, the positions of fixed objects at a height of 1 meter may be as shown in FIG. 1 and the positions of fixed objects at a different height (for example, 30 cm) may be stored in a separate map.

FIG. 2 is a view showing positions of fixed objects sensed at heights of h1, h2 and h3 according to an embodiment of the present disclosure. Reference numerals 10a, 10b and 10c are maps showing the positions of fixed objects sensed at the heights of h1, h2 and h3 and their fixability information, respectively (h1<h2<h3). A pillar at a position (7, 7) on the (x, y) coordinate in the three maps 10a, 10b and 10c is shown only in the two maps 10a and 10b. This means that the height of the pillar is lower than h3.

Likewise, an object constituting a wall at a position (9, 12) on the (x, y) coordinate is also not shown in the map 10b of the height h2. On the other hand, a fixed object is located in the map 10a of the height h1 and the map 10c of the height h3. This means the structure of a wall with an empty space in the middle. In this region, if the LiDAR sensor senses objects located at the height h2, this region may be recognized as an empty space or a space with no wall.

In the map 10b, the (9, 12) position indicates an empty space but the wall is located at both the heights h1 and h3. Therefore, it may be determined that the empty space at the (9, 12) position is between h1 and h3. Therefore, the robot can determine that the (9, 12) position is not a blind spot and can travel through the position. That is, in the process of judging a blind spot, the robot does not determine a space out of which a person or a cart cannot come, as a blind spot.

On the other hand, the fixed objects located at positions (8, 3) and (9, 3) on the (x, y) coordinate may be changed in fixability. That is, they have the fixability of 7 in the maps 10a and 10b but have the fixability of 10 in the map 10c. Such a change in fixability means that the material may be changed or a fixed object (for example, a door) may be moved.

As shown in FIG. 2, when the maps of objects sensed at various heights are formed, accuracy or precision of discrimination on a blind spot can be increased. In addition, information on the material of objects among the information of the fixed objects stored in FIGS. 1 and 2 may be added. Since concrete and glass differ in their materials, information on these materials may be stored separately in the map. Of course, the material information may be stored in combination with the above-described fixability information.

In one embodiment, a value of 10 may indicate a highly fixable wall of concrete. A value of 7 may indicate a fixed object of glass, which is highly fixable and hardly moved but may be moved or removed in specific cases. On the other hand, a value of 5 may indicate a fixed object such as a plastic or acrylic plate which may have a fixability but may be easily moved or removed. That is, in the present disclosure, the fixability information can indicate not only the fixability of fixed object but also the material information that affects the fixability.

FIG. 3 is a view showing the configuration of a robot according to an embodiment of the present disclosure. Referring to FIG. 3, a robot 1000 includes a sensing module (or sensor) 100 that senses external obstacles such as fixed objects and moving objects located around the robot, a map storage unit (or memory) 200 that stores one or more maps, a moving unit (or motor) 300 that controls a movement of the robot 1000, a functional unit (or functional module) 400 that performs a predetermined function of the robot, a communication unit (or communication interface) 500 that exchanges information on a blind spot, information on changed state of fixed objects, and the like with other robots, an interface unit (or user interface) 600 that outputs predetermined visual or auditory information to the outside, and a control unit (or controller) 900 that controls or manages these respective components.

The control unit 900 generates a traveling path of the robot based on data sensed by the sensing module 100 and data stored in the map storage unit 200. An embodiment of generating a traveling path of the robot will be described later with reference to FIG. 12. The control unit 900 controls the moving unit 300 to move the robot according to the generated traveling path or the positions of the sensed external objects. In addition, in this process, when identifying a moving object in a blind spot located in the traveling path of the robot, the control unit 900 can control the speed or direction of the moving unit 300.

The map storage unit 200 may store the positions of fixed objects in a space where the robot travels and the fixability of the fixed objects. The fixability can be determined by the degree to which an object is immobile and fixed. In addition, the material of the object can also be reflected, which is, for example, because a fixed object of concrete is less likely to be moved, whereas a fixed object of material such as an acrylic plate is more likely to be moved.

The moving unit 300 is a means for moving the robot 1000, such as a motor driving a wheel, caterpillar or the like, and moves the robot 1000 under control of the control unit 900. At this time, the control unit 900 can use the information stored in the map storage unit 200 to check the current position of the robot 1000, and provide a movement signal to the moving unit 300. In addition, the control unit 900 can analyze the information on the external obstacle sensed by the sensing module 100 to check whether a blind spot is located in the traveling direction of the robot or an unexpected obstacle is likely to appear in the traveling direction, and then control the movement speed or direction of the moving unit 300.

The functional unit 400 provides a specialized function of the robot. For example, in case of a cleaning robot, the functional unit 400 includes components required for cleaning, such as a roller or cleaning head. In case of a guidance robot, the functional unit 400 includes components required for guidance. The functional unit 400 may include various components depending on functions provided by the robot. In addition, the control unit 900 can control the functional unit 400 to perform a specific function, or control the functional unit 400 not to perform the function depending on the size or characteristics of an external obstacle.

Information on the blind spot acquired by the robot or information on the changed fixed object may be stored in the map storage unit 200. The stored information may be exchanged with other robots through the communication unit 500, or may be uploaded to a system such as a server or the like.

The interface unit 600 may output voice information or visual information to a person who exists in an adjacent region. The interface unit 600 outputs visual or auditory information to the outside. When there is a person in the traveling path of the robot, the robot may ask the person to move away or may output a sound that the robot is approaching, thereby inducing the movement of the person. In addition, characters, emoticons, images and the like requesting for the movement may be output from the interface unit 600.

In more detail, the sensing module 100 may mainly include a light detection and ranging (LiDAR) sensing unit (or LiDAR sensor) 110 and a depth camera unit (or depth sensor) 120 and may optionally include one or more of an ultrasonic sensing unit (or ultrasonic sensor) 130 or an infrared sensing unit (or infrared sensor) 130. The sensing module 100 may further include a sensing data analysis unit (or sensing data processor) 150 that analyzes the sensed values or other data collected by the sensors. In one example, the controller 190 may function as the sensing data analysis unit 150.

The components constituting the sensing module 100 are logical components but need not necessarily be physically implemented in one device. For example, the LiDAR sensing unit 110 and the depth camera unit 120 may be provided on the upper surface of the robot. In addition, two LiDAR sensing units 110 may be provided at different heights of the robot. For example, one LiDAR sensing unit 110 may be provided at the height h1 of the robot to sense objects at the height h1, while the other LiDAR sensing unit 110 may be provided at the height h3 of the robot to sense objects at the height h3.

These sensing units and the sensing data analysis unit 150 can exchange the sensed information with each other via a data link or by using a radio signal. Each of the sensing units may also be a set of various sensors. For example, in order to sense an object placed in front of the infrared sensing unit 140, one or more pairs of infrared transmitting units and infrared receiving units may be physically integrated and logically instructed to the infrared sensing unit 140. Similarly, one or more pairs of ultrasonic transmitting units and ultrasonic receiving units may be physically integrated and logically instructed to the ultrasonic sensing unit 130.

How the robot of FIG. 3 discriminates a blind spot will be described below. In one embodiment, first, the position of a fixed object such as a corner or a pillar is identified on the map and the periphery thereof is discriminated as a blind spot. In this case, the map stored in the map storage unit 200 may be used to discriminate the blind spot. Next, the sensing module 100 can check a section in which a distance from the front of the robot 1000 is suddenly increased of the data sensed while the robot 1000 is traveling.

For example, when a robot operating in a large space is traveling along a wall, the value recognized by the LiDAR sensing unit 110, that is, a value input to the LiDAR sensing unit 110, is constant. However, when a corner or a dent portion at the end of the wall is at the front, the value of the LiDAR sensing unit 110 suddenly increases. At this time, the depth camera 120 can perform sensing by selecting specific data (data of one point) sensed by the LiDAR sensing unit 110. That is, when the robot 1000 receives a value suddenly distant from the LiDAR sensing unit 110, the depth camera 120 can acquire the depth information of the corresponding region to determine whether or not the wall corresponds to the end of the region. The robot 1000 can decide to change the movement direction or speed of the robot 1000.

Figure 5:
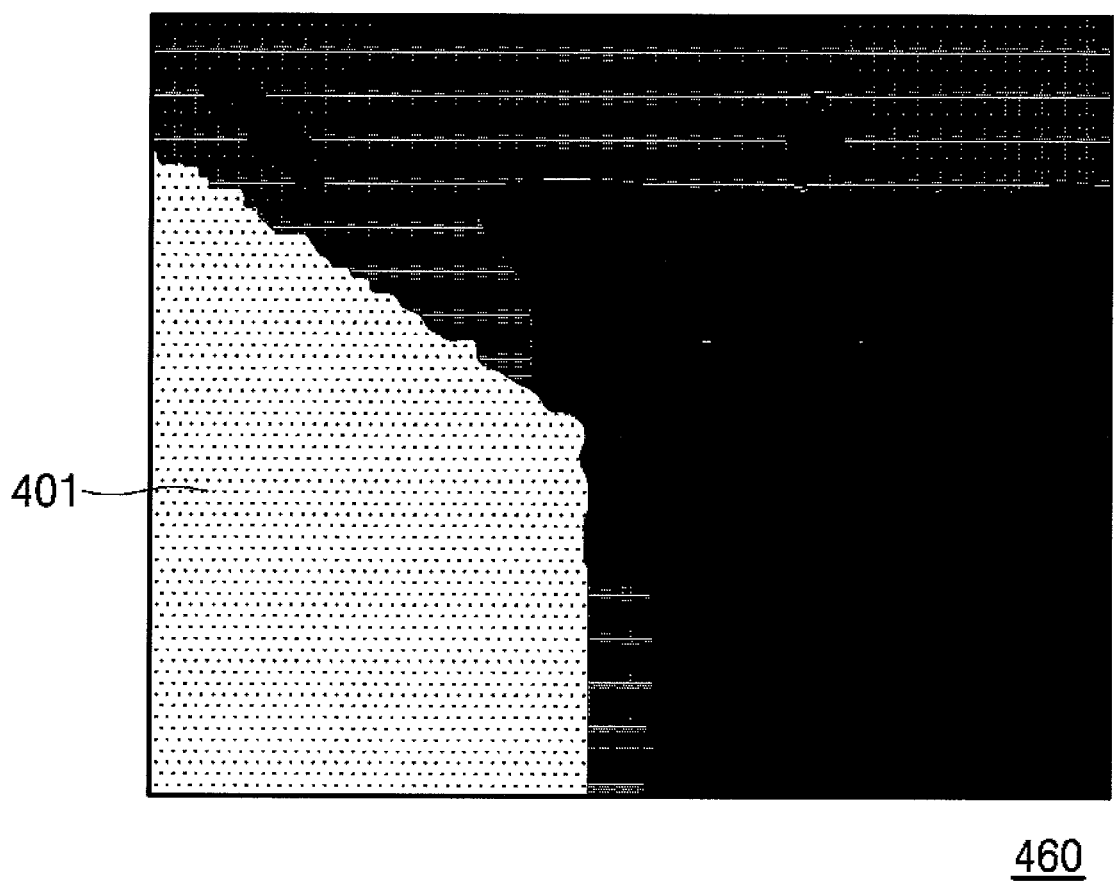
FIG. 5 is an image in which data of object depth calculated by a depth camera unit is reflected according to an embodiment of the present disclosure.
Figure 11:
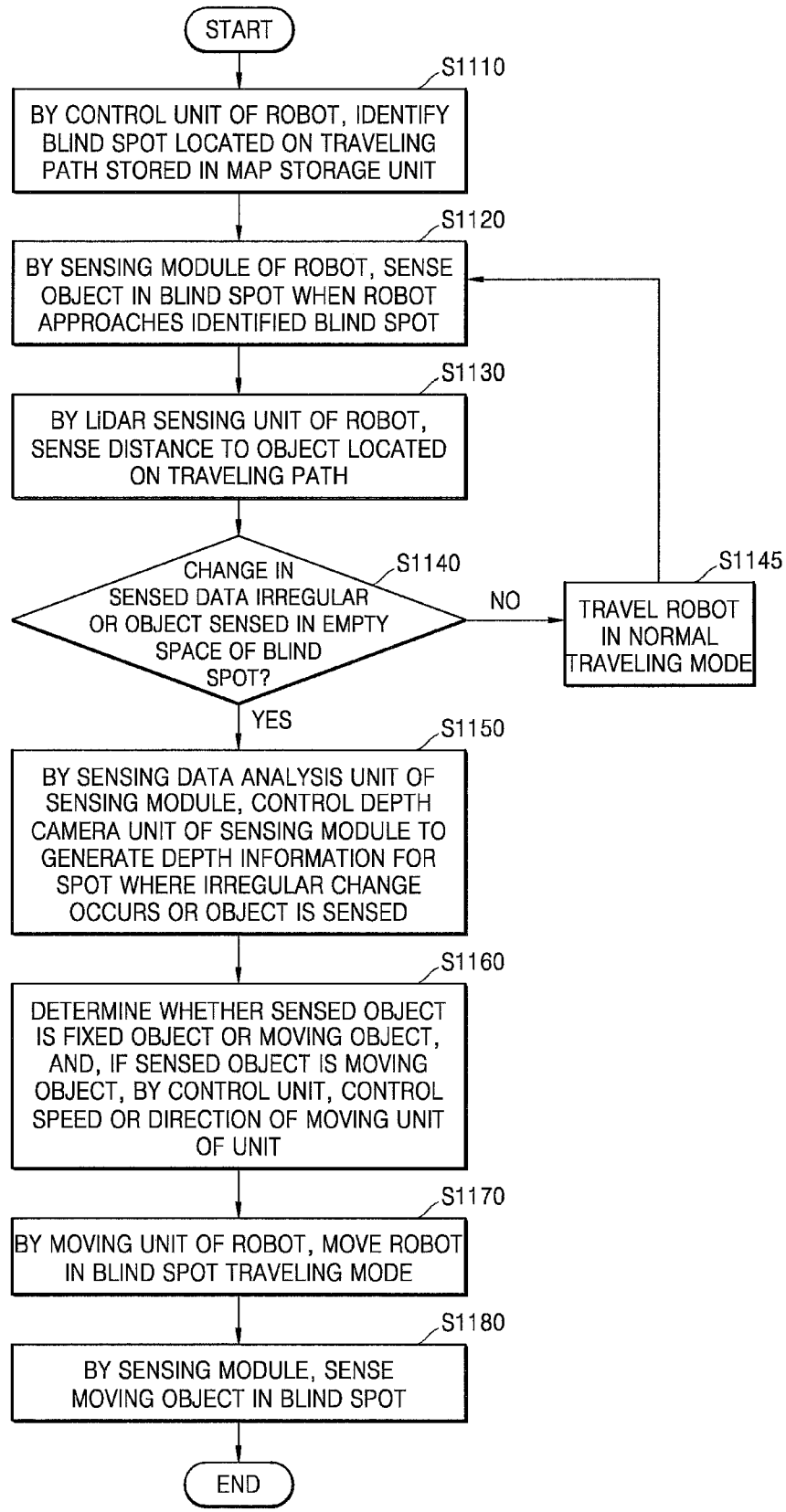
FIG. 11 is a flowchart showing a process of identifying a blind spot according to another embodiment of the present disclosure.

In another embodiment of the present disclosure, when the LiDAR sensing unit 110 of the sensing module 100 senses a distance to an object provided on the traveling path and the sensed data changes irregularly, the sensing data analysis unit 150 of the sensing module 100 can control the depth camera 120 of the sensing module 100 to generate depth information on the point where the irregular change occurs, as will described in more detail in FIGS. 5 and 11.

When the robot 1000 shown in FIG. 3 and the detailed moving method of the robot 1000 are implemented, it is possible to enhance the ability to cope with an unexpected obstacle in the process of running the robot in a large and complex space such as an airport. Particularly, the LiDAR data (distance, signal intensity, etc.) generated by the LiDAR sensing unit 110 and the depth data generated by the depth camera unit 120 can be fused and difference therebetween can be analyzed. When the fused data are combined with the map data stored in the storage unit 200, the robot can travel so as not to collide with an unexpected obstacle in a blind spot.

Figure 4:
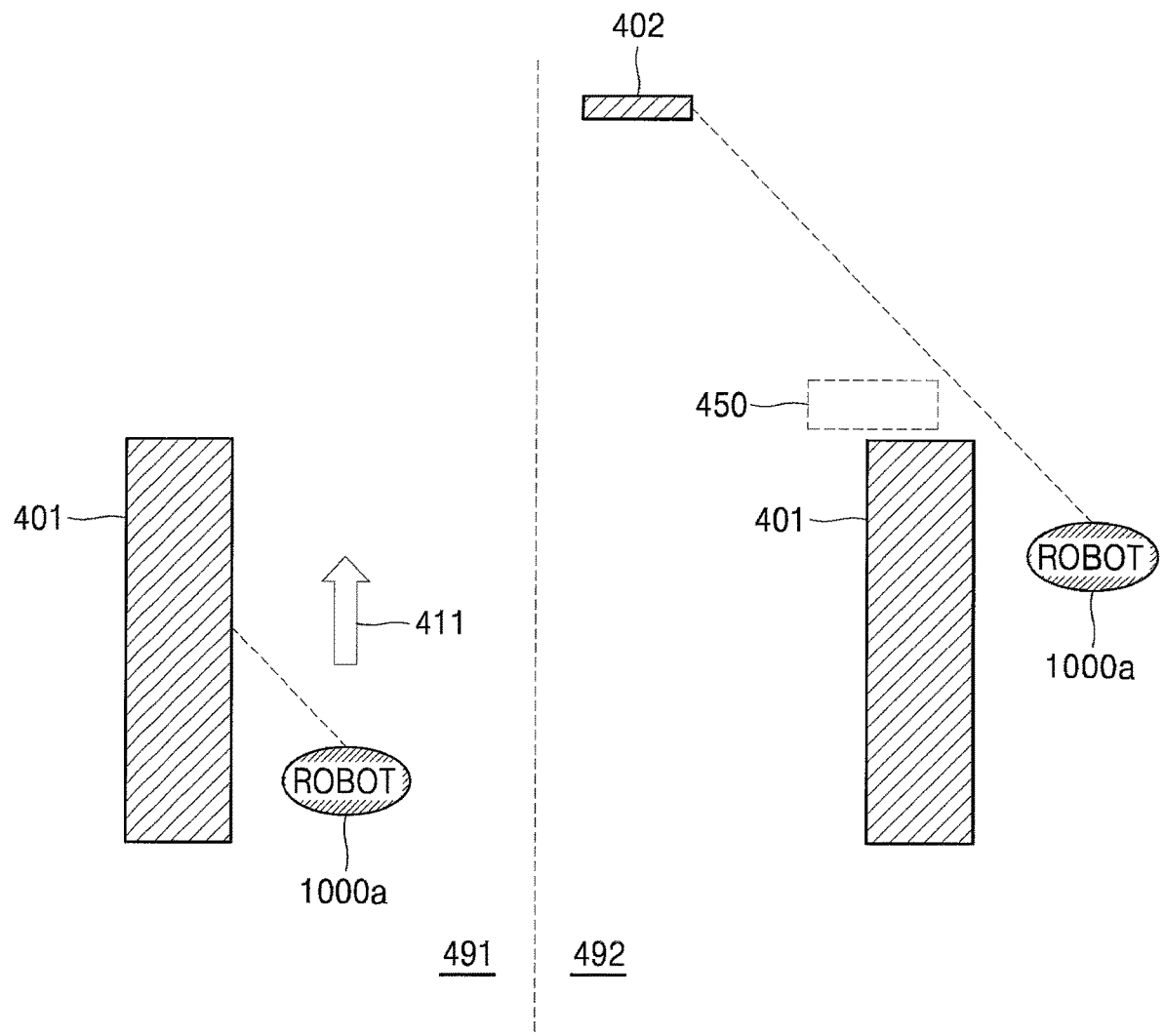
FIG. 4 is a view showing a process of checking a space in which a moving object may suddenly come out of a wall according to an embodiment of the present disclosure.

Next, a description will be given of embodiments in which the robot copes with an unexpected obstacle appearing in a blind spot. FIG. 4 is a view showing a process of checking a space in which a moving object may suddenly come out of a wall according to an embodiment of the present disclosure. It is here assumed that the robot moves from a point (4, 3) to a point (4, 15) on the map of FIG. 1. As indicated by situation 491, the robot 1000a travels along a wall 401 and the sensing module 100 of the robot 1000a senses objects located in the traveling direction of the robot 1000a. The robot 1000a continues to travel in a direction indicated by an arrow 411 while sensing that the wall 401 is located. For example, at situation 491, the robot 1000a can remain distant by, for example, 50 cm from the wall 401.

On the other hand, as indicated by situation 492, when the robot approaches the end of the wall 401, the distance sensed by the sensing module 100 of the robot 1000a suddenly increases, which corresponds to a region indicated by 30 in FIG. 1. For example, a sensing value of the LiDAR sensing unit 110 at the end of the wall may be irregularly increased. This is because an object behind the wall 401 is sensed in the absence of the wall 401, and a value different from the distance to the sensed wall 401 can be derived. For example, at situation 492, the robot 1000a may sense an object 402 located behind the wall 401 in a space where the wall 401 has disappeared, and may sense that a distance to the object 402 is 3 meters. In this case, since there is a possibility that a new moving object appears at the end of the wall 401, the control unit 900 of the robot 1000a can control the moving unit 300 to change the traveling speed or direction of the robot 1000a. That is, the object 402 sensed by the robot 1000a at situation 492 is at a long distance but there is a blind spot 450 at the end of the wall, and a person or an object can move in the blind spot 450. Therefore, the moving object may suddenly move from the blind spot 450 to the traveling path of the robot 1000a, and the robot 1000a can perform an operation to avoid an unexpected obstacle or prevent a collision with the unexpected obstacle in a situation 492. In one embodiment, the robot 1000a may perform functions such as changing the traveling path, lowering the traveling speed, or generating a beep (or other warning) indicating that the robot is moving.

As shown in FIG. 4, when a value (distance to an object) sensed by the LiDAR sensing unit 110 suddenly increases in order to prevent the robot from colliding with an obstacle that may come out of a blind spot behind a wall or a pillar, the depth camera unit 120 selects a specific point or a specific area in the selected region to generate depth data of the corresponding region. As a result, when an object such as a wall is identified as a point which no longer continuous, the robot can be decelerated to the point where the wall is finished, and can run at a regular speed after checking that there are no obstacle. This is equally applicable to a pillar. Similarly, when the distance information sensed by the LiDAR sensing unit 110 changes abruptly, the robot can use the depth camera 120 to calculate the depth of an object located in front of the robot to check whether or not the object is a pillar. If it is checked that the object is a pillar, the robot can be decelerated and then can run a regular speed.

FIG. 5 is an image in which data of object depth calculated by the depth camera unit is reflected according to an embodiment of the present disclosure. When the distance information sensed by the LiDAR sensing unit 110 at the point where the wall located on the left side of the robot 1000a ends abruptly increases as indicated by situation 492 in FIG. 4, an image obtained by the depth camera unit 120 calculating the depths of objects in front is indicated by 460. It can be confirmed from this image that the depth data for a wall 401 and the depth data for spaces behind the wall 401 are different from each other. The depth data from objects located in the spaces behind the wall 401 show that these objects are far apart. Therefore, the robot 1000a approaching the end point of the wall 401 can move so as to avoid a collision with a moving object suddenly appearing on the end point of the wall 401.

For this purpose, in order to allow the robot 1000a to more accurately identify a non-contiguous space, the sensing data analysis unit 150 or the control unit 900 can perform an operation of aligning the various sensors constituting the sensing module 100 an matching specific one of the data sensed by the LiDAR sensing unit 110 and the data sensed by the depth camera unit 120. This may vary depending on a distance between the robot 1000a and a portion where the wall ends and an obstacle may appear. In addition, the control unit 900 can more accurately identify an unexpected obstacle occurrence section by fusing the information sensed by the sensing module 100 and the map information stored in the map storage unit 200.

For example, the robot can use the maps shown in FIGS. 1 and 2 to construct a traveling path. In the course of traveling, the robot can constantly check or update its position by comparing the map and the wall that the robot wall-follows. That is, the robot can recognize the wall through the LiDAR sensing unit 110 and the depth camera unit 120 and compare a distance to the sensed wall with the map stored in the map storage unit 200. If the current position of the robot has an error, the current robot position can be updated to correct the position.

Thereafter, when the robot calculates a point at which the wall ends on the map, and approaches the point, the robot can use the various sensing units to check whether or not the wall ends, and can perform an operation in response to a blind spot. In particular, in one embodiment of the present disclosure, the LiDAR sensing unit may provide signal intensity information of returned data differently depending on the material of an obstacle. Accordingly, the robot analyzes the signal intensity information of the obstacle provided by the LiDAR sensing unit 110 to determine the material of the wall/glass. Based on a result of the determination, the robot changes a traveling algorithm to designate an attention zone and the like. This information can be stored as fixability information or separate material information in the map.

When the above-described robot is implemented, it is possible to calculate the probability of occurrence of an unexpected obstacle while the robot is traveling in a large area, or to adjust the movement speed and direction of the robot accordingly, thereby improving the ability to cope with the unexpected obstacle. In addition, it is possible to develop a robot traveling algorithm for this purpose. Especially, it is possible to create robot traveling scenarios in a specific obstacle section to diversify the robot traveling method. For example, without performing a corresponding scenario for an unexpected obstacle in a section where the robot moves regardless of a blind spot, the robot can travel and function according to a corresponding scenario for an unexpected obstacle in proximity to a blind spot.

Figure 6:
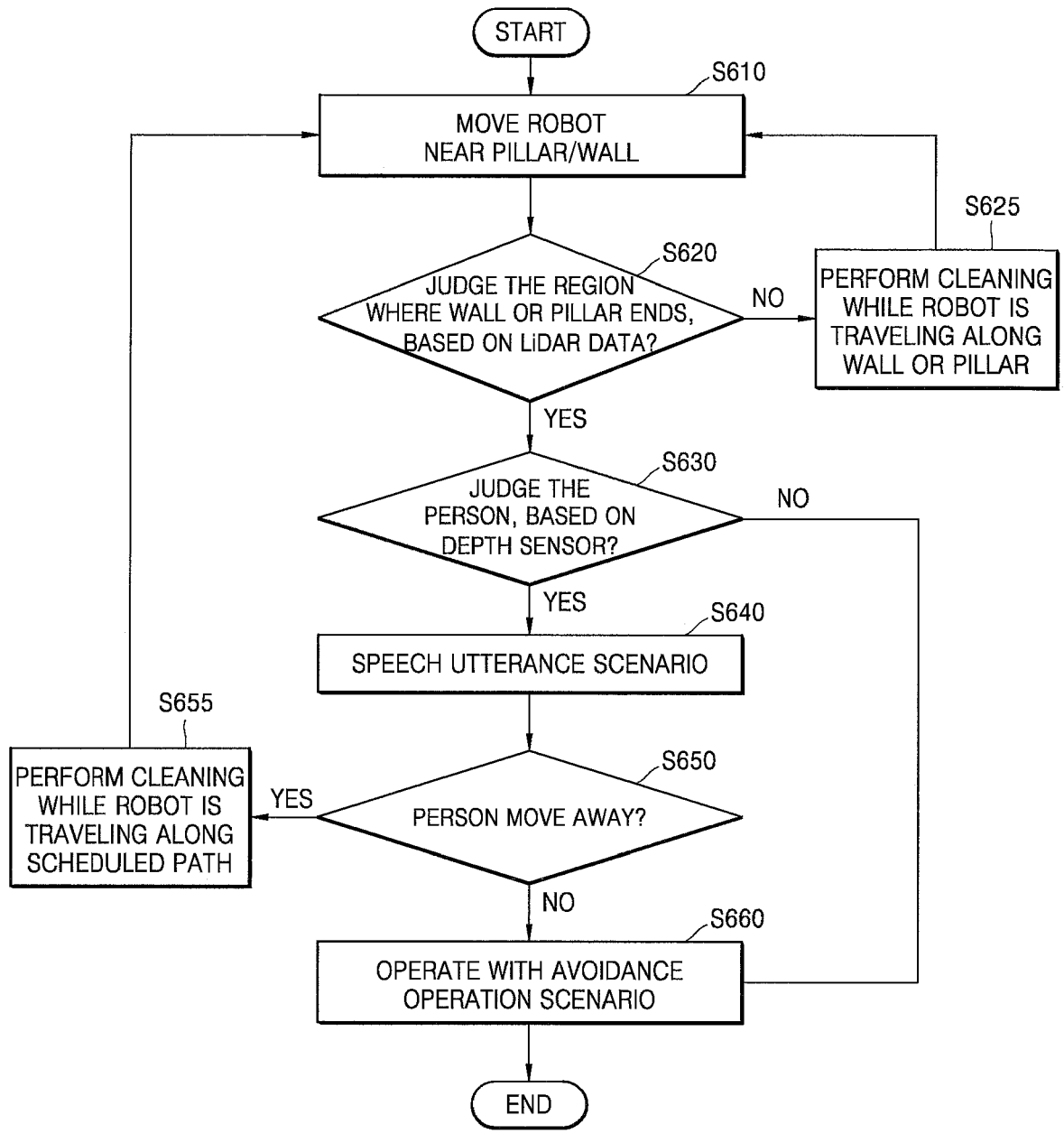
FIG. 6 is a flowchart showing a process of identifying or sensing a blind spot and performing a corresponding operation while the robot is traveling according to an embodiment of the present disclosure.

FIG. 6 is a flowchart showing a process of identifying or sensing a blind spot and performing a corresponding operation while the robot is traveling according to an embodiment of the present disclosure. First, the moving unit 300 of the robot runs the robot, and the control unit 900 can use the map storage unit 200 and the sensing module 100 to move the robot near a pillar or a wall (S610). In this process, based on the LiDAR sensing data provided by the LiDAR sensing unit 110 of the sensing module 100, it is determined whether there is a region where the wall or the pillar ends (S620). In other words, on the basis that the data sensed by the LiDAR sensing unit 110 suddenly increases or the intensity of the sensed data suddenly changes, the control unit 900 can recognize that a discontinuous spatial change has occurred. Alternatively, the control unit 900 may check a blind spot using the map information stored in the map storage unit 200. When the robot travels near the blind spot, the control unit can increase the sensing accuracy by increasing the sensing period or interval of the LiDAR sensing unit 110 or by using different kinds of sensing data.

If there is no region where the wall or the pillar ends, the robot can travel along the wall or the pillar to perform a specific function, for example, a cleaning function (S625). If there is a region where the wall or the pillar ends, for example, a blind spot, an object moving in the corresponding region may be determined using the depth sensing unit 120 (S630). More specifically, it can be checked whether or not a person exists in the corresponding region. If the moving object is not a person, the robot 1000 moves to avoid the object according to an obstacle avoidance operation scenario (S660). On the other hand, if the moving object is a person, the robot can take a personal action through the interface unit 600. For example, in accordance with a speech utterance scenario (S640), the robot may use a stored voice to ask the person to move away or pay attention to the movement of the robot. If the person has moved away from the corresponding position (S650), the robot can travel on the predetermined path to perform predetermined functions such as cleaning, security, guidance and the like (S655).

In addition, the functional unit 400 can take the personal action. For example, when persons are in the vicinity, the functional unit can perform a cleaning function of sucking more dusts. A guidance robot can start a guidance function. That is, when a person appears or is detected in a blind spot, the robot can perform a specific personal operation of given functions. In addition, the robot can also increase the volume of a sound so that people can avoid the robot. In addition, a cleaning robot can narrow the range of extension of a cleaning brush so that the cleaning brush does not advance before a sensor in a blind spot, or the robot may be rotated such that the cleaning brush does not protrude from the front surface.

As described above, the robot can use the values sensed by the sensing module and the map to identify a blind spot, and can perform the personal operation when a moving object is a person. In particular, the map information can be used to determine a blind spot where a wall or a pillar ends with the LiDAR sensor in the step S620.

Figure 7:
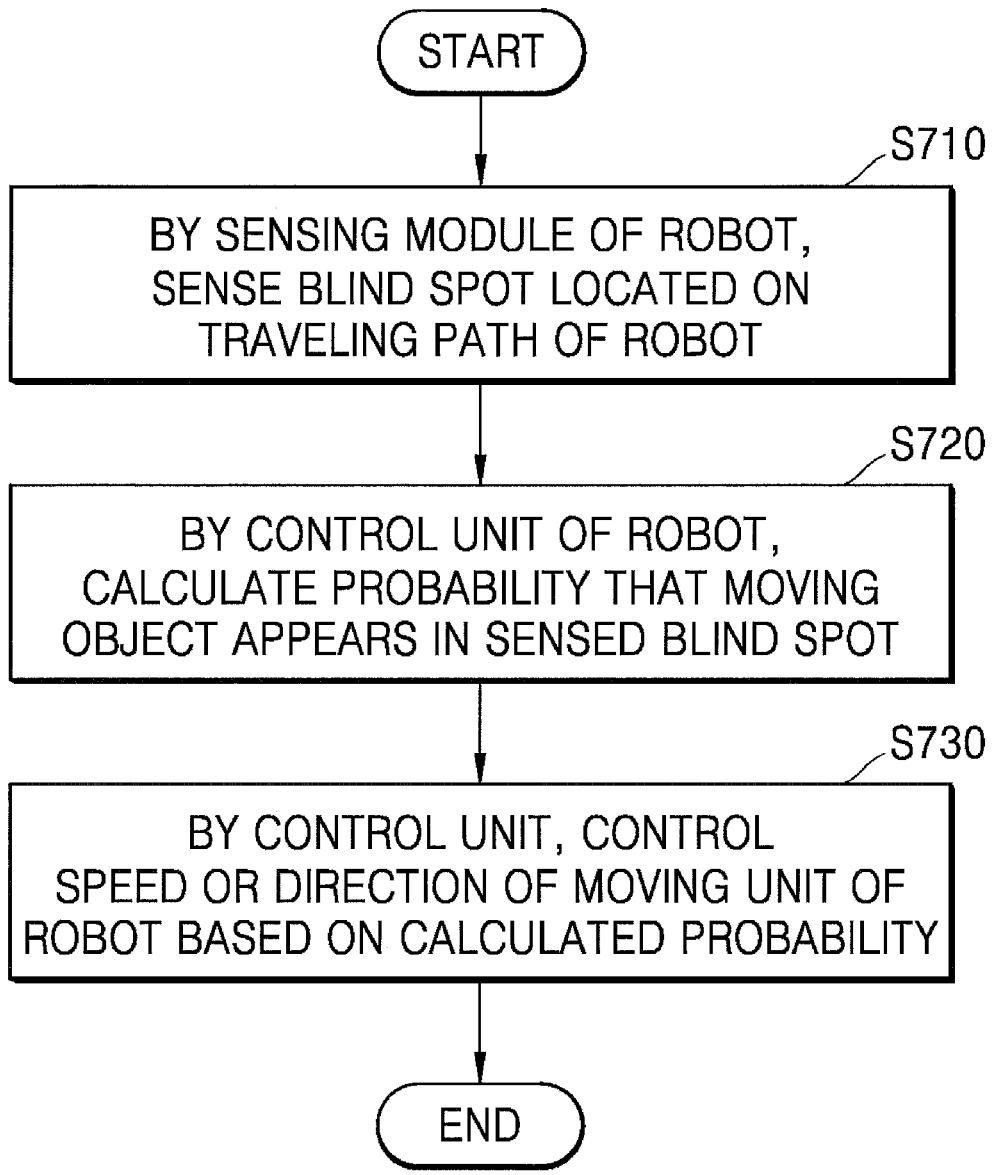
FIG. 7 is a flowchart showing a process of discriminating a blind spot in a traveling path of the robot according to an embodiment of the present disclosure.

FIG. 7 is a flowchart showing a process of discriminating a blind spot in the traveling path of the robot according to an embodiment of the present disclosure. The sensing module 100 of the robot senses a blind spot located in the traveling path of the robot (S710). The process of sensing the blind spot by using the LiDAR sensing unit 110 and the depth sensing unit 120 in FIG. 4 may be applied to the step S710. In addition, the map stored in the map storage unit 200 may be used to sense the blind spot. The controller 900 can identify a portion of the space along the traveling path that is at least partially blocked from the sensor, and the controller 900 identifies the portion of the space as the blind spot when the portion of the space is sufficiently large to receive the moving object. In the other exemplary embodiments, the controller 900 identifies a size and a shape of the blind spot, and the controller calculates the probability that the moving object is located in the blind spot based on at least the size and the shape of the blind spot. The size can be divided as height and width of the blind spot. When the height is larger than 1 m, the width is wider than 50 cm, the probability of the existence of human or moving object can be increased.

Thereafter, the control unit 900 of the robot calculates the probability that a moving object appears in the blind spot (S720). The control unit 900 can calculate the probability that a moving object such as a person appears on the structure of a sensed blind spot or can check through the sensing module 100 whether or not a moving object is sensed like a person in data sensed close to the blind spot. Then, the control unit 900 calculates the probability according to the sensed value and controls the speed or direction of the moving unit 300 of the robot according to the calculated probability (S730). In addition, when the moving object is discriminated as a person, the interface unit 600 can output visual information (when light is blinking) or audible information (when a sound or voice guidance or a machine sound is raised).

FIG. 8 is a table showing sensing data obtained by the sensing module sensing a blind spot according to an embodiment of the present disclosure. The blind spot means irregularity of data sensed by the sensing module 100 at an end point of a wall or at a point such as a pillar. FIG. 8 shows the sensing data of the LiDAR sensing unit 110 of the robot 1000*a* sensed in the situations 491 and 492 of FIG. 4. The sensing data of 891 showing an embodiment of sensing at situation 491 will be described in more detail below.

"SensingTime" indicates time (hour:minute:second) when an object is sensed, "SensingDirection" indicates a direction (front/rear, left/right, angle, etc.) in which an object is sensed, "Data" indicates sensed distance data, and "Intensity" indicates the intensity of a sensed signal. The sensed values can be calculated in various ways depending on a sensing module. FIG. 8 shows the sensed values converted through a predetermined normalization process.

As indicated by sensing data 891, the LiDAR sensing unit 110 senses an object on the left front side at intervals of 5 seconds in the process of wall-following. The object is located at a distance of 0.3 meters with the intensity of the sensed signal of 10, which means that a homogeneous object is located. The control unit 900 can use the map stored in the map storage unit 200 to check that a wall is located on the left side of the robot.

On the other hand, in a situation 492, the LiDAR sensing unit 110 senses data indicated by 892. That is, the size of data suddenly sensed in the front left side increases to 2 meters. In addition, the intensity of the signal is changed to 8. That is, when the sensing unit 110 of the sensing module senses a distance to an object located in the traveling path, the intensity of a signal reflected from the object, etc., at the point of time (10:05:25) when a change in sensed data is determined to be irregular, the sensing module 100 can increase the accuracy of the sensing by adjusting the sensing interval (sensing period, sensing angle, etc.) more densely. At this point of time, the control unit 900 can calculate the appearance probability of a blind spot and a moving object based on the map stored in the map storage unit 200.

In one embodiment of the present disclosure, the sensing data analysis unit 150 can control the depth camera unit 120 to generate depth information for a spot where the irregular change has occurred (a front left 30-degree spot). As a result, when the depth camera 120 calculates the depth information as shown in FIG. 5, it can be checked based on the calculated depth information that the spot is a blind spot.

Then, the sensing data analysis unit 150 analyzes the sensed values every second and checks a distance to the object located in the front left 30-degree spot. In this process, the robot can control the speed or direction of the moving unit 300. The information sensed by the LiDAR sensing unit 110 at "10:05:27" indicates that the distance to the object sensed from the outside is 0.3 meters and the signal intensity is changed to 5. Since this means that an object of completely different material is located outside, the control unit 900 can calculate the probability that the object is a moving object through the intensity of the signal. The control unit 900 can also control the speed of the moving unit 300.

FIG. 9 is a view showing a map based on which a blind spot is identified according to an embodiment of the present disclosure. As described above with reference to FIGS. 1 and 2, the information on the position and fixability of the fixed objects is stored in the map. In a situation where the robot is positioned as indicated by 930*a* in the map of FIG. 9, the robot associates the current position of the robot on the map stored in the map storage unit 200. The cell size is assumed to be 0.5 m×0.5 m.

In addition, the control unit 900 of the robot can generate a traveling path through the map information. If the function of the robot is performed in proximity to a wall, the control unit 900 may generate a traveling path on which the robot moves to a certain extent to the wall to perform a wall-following operation.

Referring to the first map 991, the control unit 900 of the robot acquires sensing data indicating that a front space is irregular, through the sensing module 100. The control unit 900 uses the LiDAR sensing unit 110 and the depth camera unit 120 to check that there is a point 910*a* in front at which the wall ends. However, referring to the first map 991, at the end of the wall, new walls continue from a position (2, 16) to a position (2, 19), the cell size is 0.5 meters and the depth of a blind spot is also 0.5 meters. Since this is not a space of depth from which a person can move out, the probability that a moving object such as a person appears is not high. In this case, 910*a* may not be identified as a blind spot. Alternatively, while 910*a* is identified as a blind spot, the low probability that a moving object appears may be calculated as in the embodiment of S720 of FIG. 7.

In summary, in discriminating a spot as a blind spot on a traveling path, the robot does not identify a space where a person hardly appears as a blind spot or determines that this space has a low probability that a moving object appears, thereby setting a traveling path or keeping a traveling speed.

Referring to the second map 992, the control unit 900 of the robot acquires sensing data indicating that a front space is irregular, through the sensing module 100. The control unit 900 uses the LiDAR sensing unit 110 and the depth camera unit 120 to check that there is a point 910*b* in front at which the wall ends. However, referring to the second map 992, at the end of the wall, new walls continue from a position (0, 16) to a position (0, 17), the cell size is 0.5 meters and the depth of a spot is 1.5 meters, which is a space of depth from which a person can move out. In addition, since the length of the new walls is short (1 meter), the probability that a moving object such as a person appears is high. In this case, 910*b* may be identified as a blind spot. Alternatively, while 910*b* is identified as a blind spot, the high probability that a moving object appears may be calculated as in the embodiment of S720 of FIG. 7.

In summary, the control unit 900 can generate the traveling path of the robot based on the map of the map storage unit 200 and identify a blind spot located on the traveling path in the map. In addition to identifying the blind spot, the control unit 900 can calculate the probability that a moving object appears as an unexpected obstacle. For example, considering the information on the depth and width of the blind spot and the height information of the blind spot as shown in FIG. 2, the control unit 900 can check whether or not the blind spot is a space where a person may suddenly come out, calculate the probability that a moving object appears, and control the movement speed or direction of the robot based on the calculated probability.

In a case where a person is standing at a point (3, 16) in the region 910*a* in the map 991 of FIG. 9, a signal sensed by the LiDAR sensing unit 110 has no change in distance but may differ in intensity. For example, the intensity of the signal reflected from the wall of points (3, 4) to (3, 15) differs from the intensity of the signal reflected from a person standing at a point (3, 16). When the intensity of the signal is changed, the control unit 900 compares the map 991 with the map of the map storage unit. Since there is a possibility that a person other than the wall is standing at the corresponding position close to the wall, there is a high probability that a moving object appears or is discriminated as a person. This involves reducing the traveling speed of the robot by recognizing an object keeping close to the wall as a person.

That is, the sensing module 100 of the robot senses an object in the blind spot, analyzes the sensed data by means of the sensing data analysis unit 150, and provides data discriminating whether this object is a fixed object, a moving object or a person to the control unit 900. Based on this data, the control unit 900 can determine whether the sensed object is a fixed object or a moving object. According to a result of the determination, the robot can change the traveling path or perform an avoidance operation or a personal operation.

Figure 10:
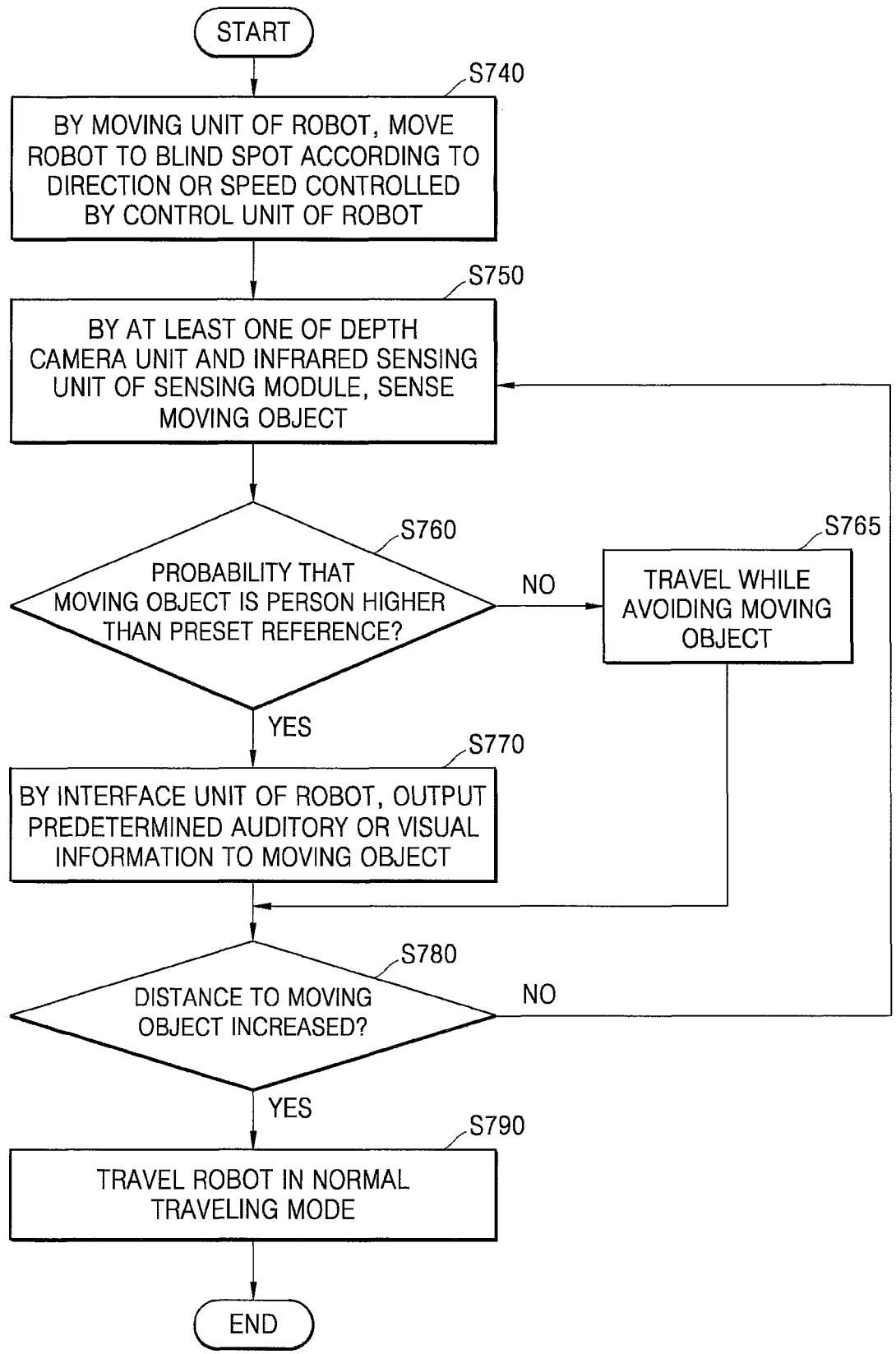
FIG. 10 is a flowchart showing a process of sensing a moving object in proximity of the robot to a blind spot according to an embodiment of the present disclosure.

FIG. 10 is a flowchart showing a process of sensing a moving object in proximity of the robot to a blind spot according to an embodiment of the present disclosure. The moving unit 300 of the robot moves the robot to a blind spot according to the direction or speed controlled by the control unit 900 of the robot (S740). Thereafter, the sensing module senses a moving object in the blind spot. According to the characteristics or movement of the sensed moving object, the robot can change the traveling path, avoid the moving object or output visual information or auditory information through the interface unit 600.

In more detail, at least one of the depth camera unit 120 and the infrared sensing unit 140 of the sensing module 100 senses a moving object (S750). The depth camera 120 can sense or check a moving object having a human shape through the depth image provided in the front. In addition, the infrared sensing unit 140 can sense the temperature of the moving object in front.

Based on a result of the sensing, the sensing data analysis unit 150 checks whether or not the probability that the moving object is a person is higher than a preset reference (S760). The sensing data analysis unit 150 can use the combination of the two sensing units to check whether or not the moving object corresponds to a person. For example, the sensing data analysis unit 150 may compare a shape calculated by the depth camera unit 120 with various stored data values for a human shape. If a match ratio exceeds a certain value, for example, 80%, the sensing data analysis unit 150 determines the moving object as a person. In addition, depending on whether or not a range of temperature sensed by the infrared sensing unit 140 matches the human body temperature within a tolerance range, the sensing data analysis unit 150 can check whether a moving object exists on the traveling path of the robot or is a person. The sensing data analysis unit 150 can calculates the probabilities are proportional to a width, a length, or an area of the blind spot, or that probabilities are assigned a relatively high value (e.g., 100%) when the width, length, or area of the blind spot is equal to or more than a threshold value, and are assigned a relatively small value (e.g., 0%), when the width, length, or area of the blind spot is less than the threshold value. Additionally or alternatively sensing data analysis unit 150 uses the sensed attributes (e.g., size, height, materials) of other blind spots, and stores data identifying whether moving objects are located in the other blind spots, and determines the probabilities based on similarities between the new blind spot and the other blind spots. The sensed attributes about the blind spots are divided as height or width or material. So if the height or width is calculated as human being or moving object appendant to human being, the probabilities can be assigned a relatively high value (e.g., 100%). The probabilities can be increased by the height or width.

If the moving object is highly likely to be a person, the sensing data analysis unit 150 provides this information to the control unit 900. Based on this information, the control unit 900 controls the interface unit 600 of the robot to output the audible or visual information set in advance to the moving object (S770). As a result, it is checked whether or not a distance between the moving object and the robot is distant (S780).

If it is checked that the moving object moves away from the robot, the control unit 900 controls the moving unit 300 to travel the robot in a normal traveling mode (S790). If it is checked that the moving object does not move away from the robot, the control unit 900 can continuously perform the same sensing operation as in the step S750 for the moving object and can the above-described process (S760 to S770). On the other hand, if it is checked at S760 that the moving object is less likely to be a person, the control unit 900 controls the moving unit 300 to avoid the moving object (S765).

FIG. 11 is a flowchart showing a process of identifying a blind spot according to another embodiment of the present disclosure. The control unit 900 of the robot identifies a blind spot located on the traveling path in the map stored in the map storage unit 200 (S1110). A blind spot can be identified by checking a discontinuous space on the map as shown in FIG. 9. Thereafter, when the robot approaches the identified blind spot, the sensing module 100 of the robot senses an object in the blind spot (S1120). As the robot approaches the identified blind spot, the control unit creates a new traveling path based on the map. While the robot is traveling along the created traveling path, the control unit 900 of the robot continues to update the current position of the robot to check whether or not the robot has approached the blind spot at a certain distance. Meanwhile, the LiDAR sensing unit 110 and the depth camera unit 120 are used to sense an object in the blind spot.

In more detail for the sensing of the object in the blind spot, the LiDAR sensing unit of the sensing module senses a distance to the object located on the traveling path (S1130). Then, the control unit 900 checks whether a change in the sensed data is irregular or the object is sensed in an empty space in the blind spot (S1140). Otherwise, the robot travels in the normal traveling mode (S1145) and continuously senses the object in the blind spot (S1120).

On the other hand, if it is checked at S1140 that a change in the sensed data is irregular or the object is sensed in an empty space in the blind spot, the sensing data analysis unit of the sensing module controls the depth camera unit of the sensing module to generate depth information for a spot where an irregular change occurs or an object is sensed (S1150). Based on the depth information, the control unit 900 and the sensing module 100 of the robot determine whether the sensed object is a fixed object or a moving object. If the sensed object is a moving object, the control unit 900 controls the speed or direction of the moving unit of the robot (S1160).

Thereafter, the moving unit 300 of the robot moves the robot to a blind spot traveling mode which will be described later (S1170). Then, the sensing module senses a moving object in the blind spot while maintaining the blind spot traveling mode (S1180). In one embodiment, the sensing of the moving object is performed according to the steps S740 to S790 of FIG. 10.

FIG. 12 is a view showing a map in which a traveling path of the robot is constructed in a blind spot traveling mode according to an embodiment of the present disclosure. When the robot travels in a wall-following manner in the normal traveling mode, the robot may construct a traveling path in the vicinity of the end point of a wall in a manner other than the wall-following manner. For example, as shown in FIG. 12, the robot may construct a path in a way that a distance to a fixed object increases in some regions on a traveling path starting from a point (0, 1) and arriving at a point (0, 13). In FIG. 12, a solid line indicates a path along which the robot moves in the normal traveling mode and a dotted line indicates a path along which the robot moves in the blind spot traveling mode.

A map 1201 shows a traveling path along which the robot travels in a wall-following manner. Since the robot travels along the wall, there is a possibility of collision with a moving object which may exist in a blind spot. In particular, when the moving object moves toward the traveling path of the robot, there is a risk that the robot cannot detect the moving object and collides with the moving object at points (4, 2) and (2, 12) in the map 1201.

Among continuous fixed objects, a fixed object having a fixability value of 3 lower than a fixability value of 10 of ambient objects may be located at a point (3, 6). In one embodiment, the fixed object may be a door, a glass wall or the like. A person may suddenly come out of such a space. If the robot runs straight as in 1201, the robot may collide with the person coming out of a door.

On the other hand, a map 1202 shows a traveling path along which the robot approaches the blind spot in the blind spot traveling mode other than the normal traveling mode such as the wall-following. As shown in FIG. 12, the robot can move from a point (3, 1) in a direction away from the wall to sense a moving object in the blind spot. That is, a moving object at a point (4, 3) cannot be sensed at the point (3, 1). However, if the robot moves along a path of (3, 1)→(3, 0)→(4, 0), the moving object can be sensed at the point (4, 3). Therefore, when the moving object is sensed, the robot can travel while avoiding the moving object. If the moving object is sensed as a person, the robot can output the visual/auditory information through the interface unit 600 to request the person to move away. If a distance to the person increases, the robot can travel in the normal traveling mode such as the wall-following. Similarly, in order to avoid a door (fixed object having a fixability value of 3) located at a point (3, 6), the robot can move along a traveling path of (4, 5)→(5, 5)→(4, 5) to prevent the robot from colliding with a person who may come out of the door.

Since the robot cannot sense a moving object located at a point (3, 12) even at a point (4, 11), the robot can move along a path of (4, 11)→(5, 11)→(4, 12) to sense the moving object located at the point (3, 12). Therefore, depending on whether or not a moving object exists or whether or not the moving object is a person, the robot can travel while avoiding the moving object or perform a personal operation.

Figure 13:
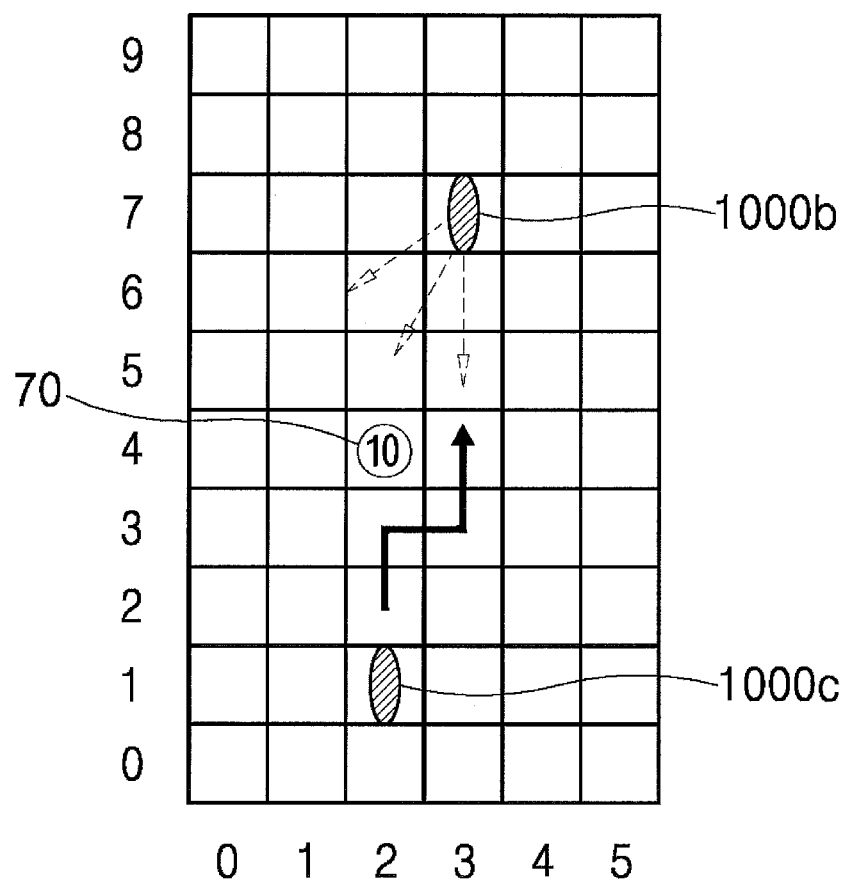
FIG. 13 is a diagram showing a map used to explain a process in which a plurality of robots exchanges information on an unexpected obstacle according to an embodiment of the present disclosure.

FIG. 13 is a diagram showing a map used to explain a process in which a plurality of robots exchanges information on an unexpected obstacle according to an embodiment of the present disclosure. In a large space such as an airport, a terminal, a hospital or the like, a plurality of robots may perform the same or different predetermined functions. For example, when the positions of a first robot and a second robot are changed, there may occur a situation where a blind spot region for the first robot is not a blind spot for the second robot. For example, when the first robot moves ahead of a pillar and the second robot moves toward the same pillar, a blind spot for the second robot may be sensed by the first robot.

FIG. 13 shows a process in which two or more robots exchange information of a moving object with respect to a specific blind spot in this situation. As shown in the figure, a first robot 1000b is positioned at a point (3, 7) and a second robot 1000c is positioned at a point (2, 1). The second robot 1000c travels along a traveling path of (2, 2) to (3, 4), while avoiding a pillar 70 having a fixability value of 10. However, the second robot 1000c cannot sense moving objects that come out of the pillar 70 in the traveling path of the second robot 1000c.

Thus, the second robot 1000c uses the communication unit (500) to transmit a message indicating whether or not there is a robot capable of sensing a blind spot behind the pillar 70. The first robot 1000b receiving the message compares its own position with the position information of the blind spot included in the message to sense the blind spot behind the pillar 70, and transmits the sensed data. In one embodiment, the LiDAR sensing unit 110 of the first robot 1000b may transmit the position of the first robot 1000b, a distance to a sensed obstacle and the signal strength to the second robot 1000c. In another embodiment, the depth camera unit 120 of the first robot 1000b may transmit the position of the first robot 1000b and the depth image acquired at the position to the second robot 1000c.

In still another embodiment, the position of the first robot 1000b and the position or distance information of an external obstacle acquired by the ultrasonic sensing unit 130 and the infrared sensing unit 140 may be transmitted to the second robot 1000c. Each of the sensing units can calculate various data in terms of accuracy, direction or height of sensing. Accordingly, by combining these features, the first robot 1000b can transmit the result of sensing various objects in a blind spot behind the pillar 70 to the second robot 1000c. The transmission method includes a method of directly communicating between the first robot 1000b and the second robot 1000c and a method of communicating via a separate server.

Figure 14:
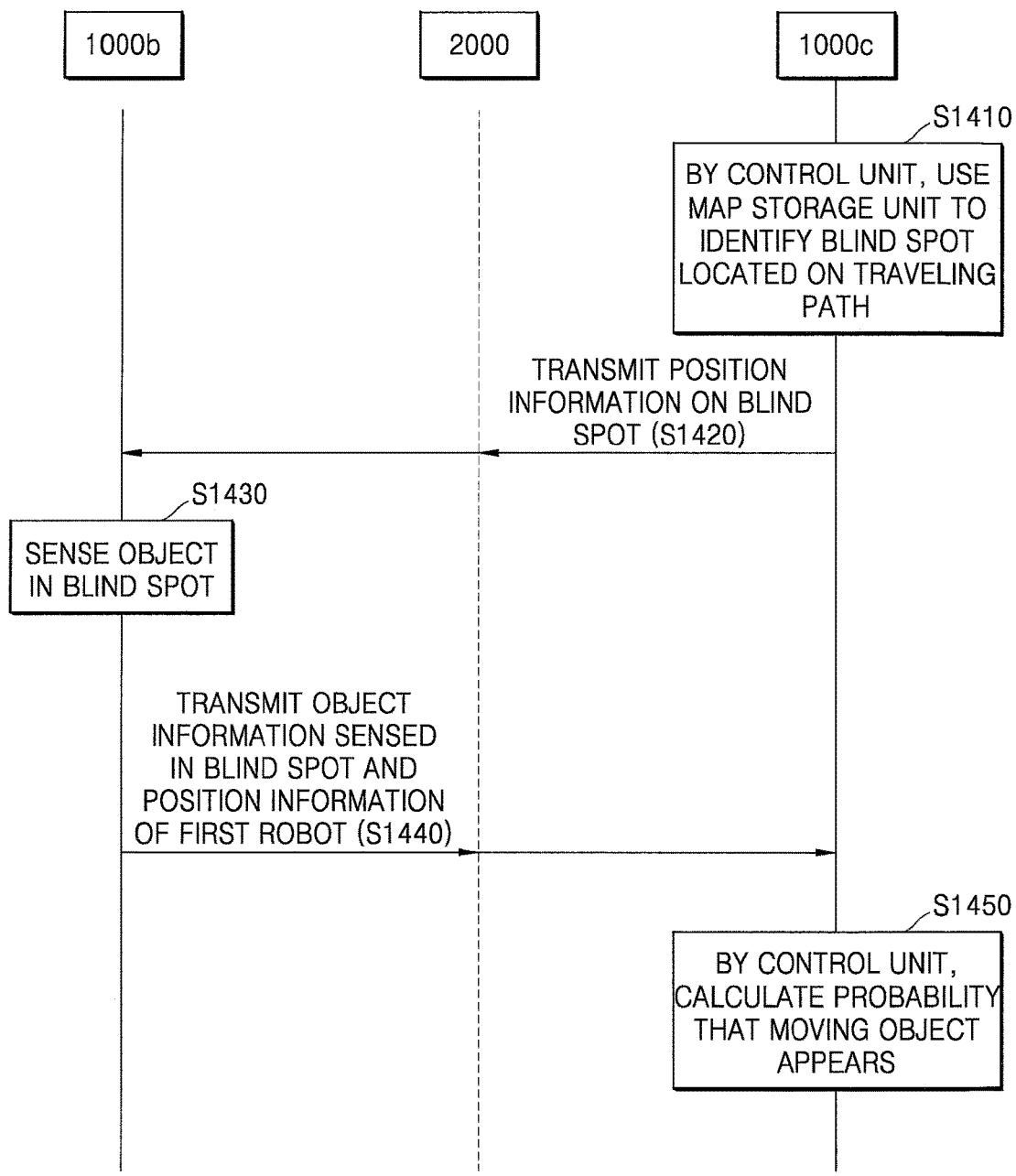
FIG. 14 is a diagram showing a process of sensing a moving object in a blind spot between a plurality of robots according to an embodiment of the present disclosure.

FIG. 14 is a diagram showing a process of sensing a moving object in a blind spot between a plurality of robots according to an embodiment of the present disclosure. The embodiment of FIG. 14 includes a first robot 1000b, a second robot 1000c, and optionally a server (or computer) 2000.

The control unit 900 of the second robot 1000c uses the map storage unit 200 to identify a blind spot located on a traveling path (S1410). Then, the communication unit 500 of the second robot 1000c transmits position information on the blind spot (S1420). The transmission method includes a first method of broadcasting the position information to ambient robots and a second method of first transmitting the position information to the server 2000 and then transmitting it from the server 2000 to the ambient robots.

The first robot 1000b receiving the position information of the blind spot senses objects in the blind spot. As described above, the sensing can be performed using various sensing units (S1430). In this process, fixed objects may be excluded.

Then, the first robot transmits the sensed object information and the position information of the first robot 1000b (S1440). That is, the communication unit 500 of the second robot receives the object information sensed in the blind spot and the position information of the first robot. Similarly, the transmission method includes a first method of directly receiving the information from the first robot 1000b via the communication unit 500 of the second robot and a second method of first transmitting the information from the first robot 1000b to the server 2000 and then transmitting it from the server 2000 to the second robot 1000c. In one embodiment, the position information of the first robot may be selectively transmitted.

Thereafter, the control unit 900 of the second robot 1000c refers to the map storage unit 200 to determine whether or not an object sensed by the first robot is a moving object, and calculates the probability that a moving object appears (S1450). Based on a result of the calculation, the second robot 1000c can modify the traveling path or change the traveling speed and direction.

The robot 1000 can utilize various kinds of sensors, and can combine advantages and disadvantages of the respective sensors to more accurately sense moving objects, particularly unexpected moving objects. Although having some orientation angle, the ultrasound sensing unit 130 cannot know exactly where an obstacle is from the robot and where the obstacle begins and ends. Therefore, an object such as a pillar or a corner cannot be recognized. In one embodiment, the ultrasound sensing unit 130 may provide information on whether a moving object exists within a specific range.

On the other hand, since the infrared sensing unit 140 can sense only one point, it is possible to accurately sense whether or not a person is emerging by targeting a pillar and a corner identified by a map or other sensing units. For example, it is possible to determine whether or not a person is sensed by the infrared sensing unit 140 by targeting a point where a pillar ends from a point identified as the pillar. In one embodiment, a plurality of infrared sensing units 140 may be arranged in the front of the robot to widen the sensing range.

In addition, the LiDAR sensing unit 110 of the robot 1000 is capable of almost omnidirectional sensing with respect to a specific height, within a sensing range up to 30 m depending on the sensor price. However, there is an obstacle which cannot be sensed depending on the height. In one embodiment of the present disclosure, as shown in FIGS. 5 and 6, the depth camera unit 120 may be used to identify obstacles located at different heights that cannot be sensed by the LiDAR sensing unit 110.

Figure 15:
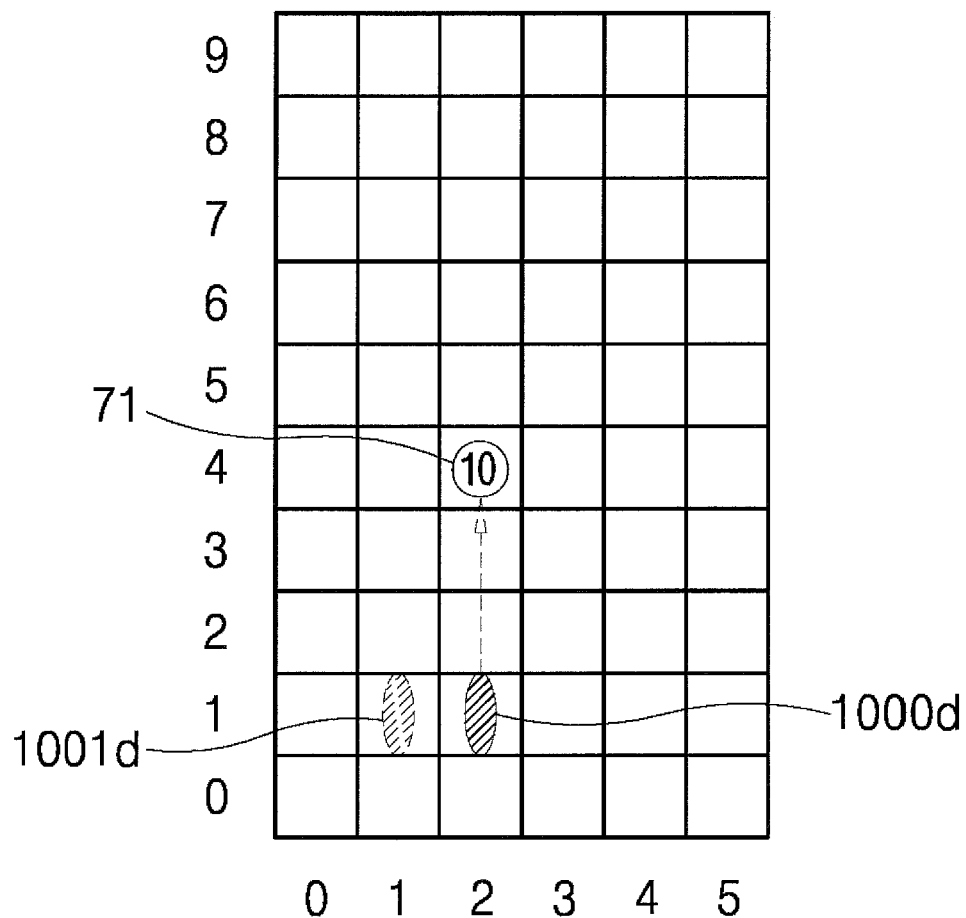
FIG. 15 is a diagram showing a process of correcting position information of a robot in proximity to a blind spot according to an embodiment of the present disclosure.

FIG. 15 is a diagram showing a process of correcting position information of a robot in proximity to a blind spot according to an embodiment of the present disclosure. The robot is actually located at a point (2, 1) (1000d) but is identified as being located at a point (1, 1) (1001d) on the map by the control unit 900 of the robot. In this state, the sensing module 100 of the robot senses a front object 71, which cannot be sensed at the point (1, 1). Accordingly, the control unit 900 of the robot determines whether the sensed front object 71 is a moving object or a fixed object. It is possible to check whether the front object 71 is a fixed object or a moving object by comparing a distance sensed by the LiDAR sensing unit 110, the signal intensity and the like. Alternatively, the depth image acquired by using the depth camera unit 120 may be used identify whether the object 71 is a pillar or a moving object. When the object 71 is identified as a pillar, the control unit 900 may refer to the map of the map storage unit to correct the position of the robot 1000d to the point (2, 1).

In a state where corners and pillars are defined on the map using the map data held by the robot and the robot is set to perform a deceleration run in the vicinity thereof, when the robot erroneously judges its current position or the map data is missed due to an unexpected error, the sensed data as shown in FIG. 15 may be compared with the map to improves the ability of the robot to respond to unexpected obstacles, which can reduce the possibility of collision of the robot with a person.

According to the present disclosure, by fusing data provided by various sensing units (a LiDAR sensing unit, a depth camera unit, an ultrasonic sensing unit, an infrared sensing unit and so on)), it is possible to discriminate a danger zone in which unexpected moving obstacles appear, that is, blind spots. For example, these sensed data can be used to detect whether or not an object in front is an unexpected obstacle, as illustrated in FIGS. 6 and 10.

In addition, as illustrated in FIG. 12, in a blind spot where an unexpected obstacle appears, the robot can change a traveling path so as to easily sense the unexpected obstacle. In addition, as illustrated in FIG. 15, by detecting whether an object in front is an unexpected obstacle or a fixed object, it is possible to compare and fuse the existing map information and the real-time obstacle information so that a traveling path, a traveling algorithm and the current position of a robot can be updated in real time.

Figure 16:
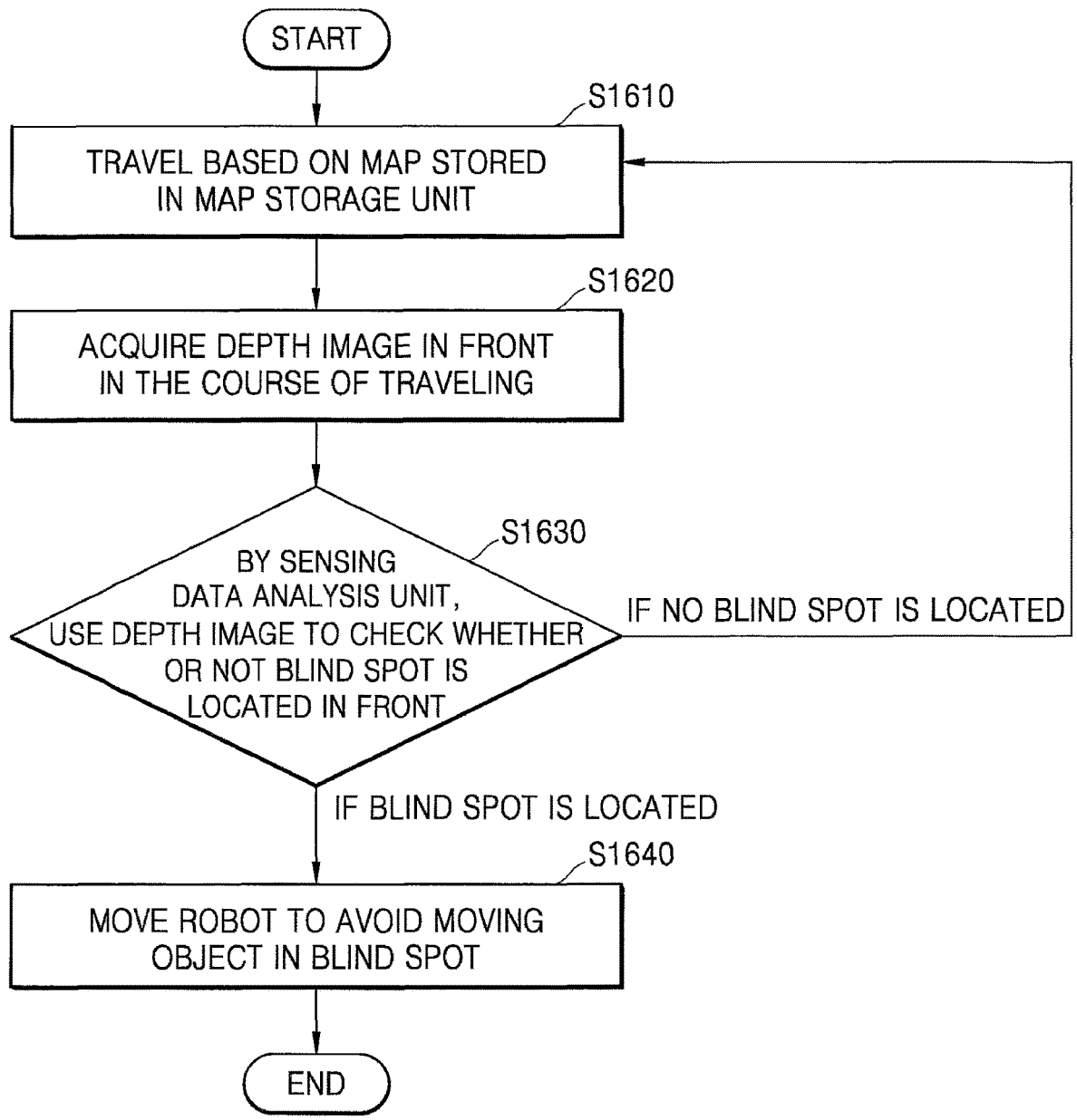
FIG. 16 is a flowchart showing a process of using a depth camera unit to travel the robot according to an embodiment of the present disclosure.

FIG. 16 is a flowchart showing a process of using the depth camera unit to travel the robot according to an embodiment of the present disclosure. The map storage unit 200 may acquire depth data on a specific point, that is, a point where a wall ends, a pillar, etc., on the past traveling path, or may receive and store the depth data from another robot.

The robot travels based on the map stored in the map storage unit 200 (S1610). A depth image in front of the robot is acquired while the robot is traveling (S1620). The acquired depth image is analyzed in real time by the sensing data analysis unit 150 to determine whether a wall ends or a pillar is located. That is, the sensing data analysis unit 150 uses the depth image to check whether a blind spot exists in front (S1630). If it is checked that a blind spot exists, the robot 1000 uses the LiDAR sensing unit 110 to avoid a moving object in the blind spot by reducing the speed or using an avoidance algorithm while maintaining the distance to the wall (S1640).

In one embodiment, the robot may move at a low speed with a free space to reduce the possibility of collision with a moving object. Of course, the infrared sensing unit 140 may be used to sense a human motion in this process. In addition, the LiDAR sensing unit 110 may use the signal intensity to compare the material of the sensed object based on the fixability information on the map, and the control unit 900 and the sensing data analysis unit 150 may check what the sensed object is.

According to the embodiments of the present disclosure, the robot can travel while avoiding collision with unexpected moving obstacles in a blind spot. In addition, according to the embodiments of the present disclosure, the robot may be accurately positioned by correcting the current position of the robot on the basis of a blind spot. Further, according to the embodiments of the present disclosure, the robot may perform a personal operation when the sensed object is a person.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program includes a magnetic storage medium, an optical storage medium, a semiconductor storage device, etc. Further, the computer program implementing the exemplary embodiments of the present disclosure includes a program module transmitted in real-time via an external device.

It is an aspect of the present disclosure to provide a technique for enabling a robot to travel without a collision in a blind spot such as a spot where a wall ends or a pillar is provided. It is another aspect of the present disclosure to provide a technique for enabling a robot to identify a blind spot and adjusting a traveling path or a traveling direction and a traveling speed of the robot in response to an unexpected obstacle appearing in the blind spot. It is another aspect of the present disclosure to provide a technique for enabling a robot to avoid a collision with an unexpected obstacle based on various sensing data sensed by the robot.

Aspects of the present disclosure are not limited to the above-described aspect, and other aspects can be appreciated by those skilled in the art from the following descriptions. Further, it will be easily appreciated that the aspects of the present disclosure can be practiced by means recited in the appended claims and a combination thereof.

According to one aspect of the present disclosure, there is provided a method of identifying an unexpected obstacle, including: by a sensing module of a robot, sensing a blind spot located in a traveling path of the robot; by a control unit of the robot, calculating a probability that a moving object appears in the sensed blind spot; and, by the control unit, controlling the speed or direction of a moving unit of the robot based on the calculated probability.

According to another aspect of the present disclosure, there is provided a method of identifying an unexpected obstacle, including: by a control unit of a robot, identifying a blind spot located in a traveling path on a map stored in a map storage unit; when the robot approaches the identified blind spot, by a sensing module of the robot, sensing an object in the blind spot; and, by the control unit, determining whether the sensed object is a fixed object or a moving object and controlling the speed or direction of a moving unit of the robot if the sensed object is a moving object.

According to another aspect of the present disclosure, there is provided a robot that identifies an unexpected obstacle, including: a sensing module that senses a fixed object and a moving object located around a robot; a map storage unit that stores the position of a fixed object in a space where the robot travels and the fixability of the fixed object; a control unit that generating a traveling path of the robot based on data sensed by the sensing module and data stored in the map storage unit; and a moving unit that moves the robot under control of the control unit, wherein the control unit identifies a moving object in a blind spot located in the traveling path of the robot and controls the speed or direction of the moving unit.

According to an embodiment of the present disclosure, the robot can travel while avoiding collision with an unexpected obstacle moving in a blind spot. According to another embodiment of the present disclosure, the robot can be accurately positioned by correcting the current position of the robot on the basis of a blind spot. According to another embodiment of the present disclosure, the robot can perform a personal operation when a sensed object is a person.

The aspects of the present disclosure are not limited to the aspects described above, and those skilled in the art of the present disclosure can easily derive the various effects of the present disclosure in the constitution of the present disclosure.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a robot, the method comprising
storing, by a memory of the robot, at least two different maps of fixed objects sensed at different heights by a sensor of the robot;
identifying, by a controller of the robot, a blind spot located along a traveling path of the robot through a space using the maps to evaluate a same position;
calculating, by the controller of the robot, a probability that a moving object is present in the blind spot; and
managing, by the controller, at least one of a speed or a direction of the robot based on the calculated probability that the moving object is present in the blind spot,
wherein the maps include:
a first map that identifies positions of the fixed objects at a first height, and
a second map that identifies positions of the fixed objects at a second height which differs from the first height, and
wherein the blind spot is at least one of a portion of a wall or a pillar.

2. The method of claim 1, wherein the sensor includes a LiDAR sensor and a depth sensor, and the method further comprises:
determining, by the LiDAR sensor, a distance to an object located along the traveling path; and
when the distance to the object changes irregularly as the robot moves through a location on the traveling path, collecting, by the depth sensor, depth information on the location where the distance to the object changes irregularly.

3. The method of claim 1, wherein further comprising:
generating the traveling path of the robot based on the maps; and
updating at least one of the maps to identify the blind spot on the traveling path.

4. The method of claim 1, further comprising:
moving the robot toward the blind spot after managing the at least one of the direction or the speed of the robot; and
sensing an object in the blind spot after the robot moves toward the blind spot.

5. The method of claim 4, wherein the sensor further includes at least one of a depth sensor or an infrared sensor, and sensing the object includes:
detecting, by the at least one of the depth sensor or the infrared sensor, an attribute of the object;
calculating a probability that the object is a person based on the detected attribute of the object; and
when the probability that the object is a person is higher than a reference value, outputting by the robot, at least one of auditory information or visual information toward the moving object.

6. The method of claim 4, further comprising:
forwarding sensing data about the blind spot to another robot.

7. The method of claim 1, wherein identifying the blind spot further includes:
identifying a portion of the space along the traveling path that is at least partially blocked from the sensor; and
identifying the portion of the space as the blind spot when the portion of the space is sufficiently large to receive the moving object.

8. The method of claim 1, wherein calculating the probability that the moving object is located in the blind spot includes:
identifying a size and a shape of the blind spot; and
calculating the probability that the moving object is located in the blind spot based on at least the size and the shape of the blind spot.

9. The method of claim 1, wherein managing the at least one of the speed or the direction of the robot based on the calculated probability that the moving object is located in the blind spot includes:
causing the robot to move away from the blind spot when the calculated probability that the moving object is located in the blind spot is greater than a reference value.

10. A method of controlling a robot, the method comprising
storing, by a memory of the robot, at least two different maps of fixed objects sensed at respective different heights;
identifying, by a controller of the robot, a blind spot located along a traveling path the robot through a space using the maps to evaluate a same position;
detecting, by a sensor of the robot, an attribute of an object in the blind spot when the robot approaches the blind spot;
determining, by the controller, whether the object is a fixed object or a moving object based on the detected attribute; and
modifying, by the controller, at least one of a speed or a direction of the robot when the object is determined to be a moving object,
wherein the maps include:
a first map that identifies positions of the fixed objects at a first height and a second map that identifies positions of the fixed objects at a second height which differs from the first height, and wherein the blind spot is at least one of a portion of a wall or a pillar.

11. The method of claim 10, wherein the sensor includes a LiDAR sensor and a depth sensor, and detecting the attribute the object in the blind spot includes:

detecting, by the LiDAR sensor, a distance to a particular object located along the traveling path; and when the distance to the particular object changes irregularly or the particular object is sensed in an empty space of the blind spot, detecting, by the depth sensor, depth information on a spot where the distance changes irregularly or the particular object is sensed.

12. The method of claim 10, further comprising:

moving the robot toward the blind spot in a blind spot traveling mode after modifying the at least one of the speed or the direction of the robot; and sensing a moving object in the blind spot after the robot moves toward the blind spot.

13. The method of claim 12, wherein the sensor further includes at least one of a depth sensor or an infrared sensor, and sensing the moving object includes:

detecting, by the at least one of the depth sensor or the infrared sensor, an attribute of the moving object;

calculating a probability that the moving object is a person based on the attribute; and when the probability that the moving object is a person is higher than a reference value, outputting at least one of auditory information or visual information toward the moving object.

14. The method of claim 10, wherein modifying the at least one of the speed or the direction of the robot includes modifying a movement of the robot to avoid a collision with the moving object.

15. A robot, comprising:

a sensor that detects data about a space in which the robot travels;

a memory that stores at least two different maps of fixed objects sensed at different heights, the maps identifying a position of each of the fixed objects in the space where the robot travels and a fixability value of each of the fixed objects;

a controller that generates a traveling path of the robot through the space based on data sensed by the sensor and the maps, and determines a blind spot using the maps to evaluate a same position; and a motor that selectively applies a driving force to move the robot, wherein the controller further identifies a moving object in the blind spot located along the traveling path of the robot and controls at least one of a speed or a direction of driving force applied by the motor to avoid a collision with the moving object, wherein the maps include:

a first map that identifies the positions of the fixed objects at a first height and a second map that identifies positions of the fixed objects at a second height which differs from the first height, and wherein the blind spot is at least one of a portion of a wall or pillar.

16. The robot of claim 15, wherein the sensor includes:

a LiDAR sensor that senses a distance to an object located on the traveling path; and a depth sensor that generates depth information for a spot at which the LIDAR sensor detects that the distance to the object changes irregularly.

17. The robot of claim 15, wherein the controller updates at least one of the maps to identify the blind spot along the traveling path, the sensor collects data about an object in the blind spot, and the controller determines whether the object is still or moving.

18. The robot of claim 15, further comprising:

a user interface that selectively outputs at least one of visual information or auditory information, wherein the sensor includes at least one of a depth sensor or an infrared sensor that detects an attribute of the moving object, the controller calculates a probability that the moving object is a person based on the attribute, and when the probability that the moving object is a person is higher than a reference value, the controller directs the user interface to output the visual information or the auditory information.

19. The robot of claim 15, further comprising:

a cleaning head coupled to the main body to perform a cleaning function.

20. The robot of claim 15, further comprising:

a communication interface that forwards data collected by the sensor to at least one of another robot or a computer.

* * * * *